United States Patent
Choi et al.

(10) Patent No.: US 9,940,013 B2
(45) Date of Patent: Apr. 10, 2018

(54) DISPLAY DEVICE FOR CONTROLLING DISPLAYING OF A WINDOW AND METHOD OF CONTROLLING THE SAME

(71) Applicant: Samsung Electronics Co., Ltd., Suwon-si, Gyeonggi-do (KR)

(72) Inventors: Jung-Hwan Choi, Seoul (KR); Kang-Tae Kim, Yongin-si (KR); Young-Jin Kim, Suwon-si (KR); Dae-Wook Park, Suwon-si (KR); Seung-Woon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/650,070

(22) PCT Filed: Dec. 5, 2013

(86) PCT No.: PCT/KR2013/011219
§ 371 (c)(1),
(2) Date: Jun. 5, 2015

(87) PCT Pub. No.: WO2014/088343
PCT Pub. Date: Jun. 12, 2014

(65) Prior Publication Data
US 2015/0317026 A1    Nov. 5, 2015

Related U.S. Application Data

(60) Provisional application No. 61/734,097, filed on Dec. 6, 2012, provisional application No. 61/737,540, filed (Continued)

(30) Foreign Application Priority Data

Feb. 1, 2013 (KR) .......................... 10-2013-0012063
Aug. 8, 2013 (KR) .......................... 10-2013-0094070

(51) Int. Cl.
*G06F 3/041* (2006.01)
*G06F 3/0481* (2013.01)
(Continued)

(52) U.S. Cl.
CPC .......... *G06F 3/0488* (2013.01); *G06F 3/0412* (2013.01); *G06F 3/0416* (2013.01);
(Continued)

(58) Field of Classification Search
CPC .. G06F 3/0416; G06F 3/0412; G06F 3/04845; G06F 2203/04101; G06F 3/1407
See application file for complete search history.

(56) References Cited

U.S. PATENT DOCUMENTS

| 5,487,143 A | 1/1996 | Southgate |
| 2008/0158189 A1 | 7/2008 | Kim |

(Continued)

FOREIGN PATENT DOCUMENTS

| CN | 102103456 A | 6/2011 |
| CN | 102339203 A | 2/2012 |

(Continued)

*Primary Examiner* — Tapas Mazumder
(74) *Attorney, Agent, or Firm* — Jefferson IP Law, LLP

(57) ABSTRACT

A method of controlling a display device including a touch screen is provided. The method includes displaying, on the touch screen, a plurality of windows respectively corresponding to executing applications, such that the windows do not overlap each other, displaying a plurality of boundary lines differentiating the plurality of windows, and a center button disposed at an intersection point of the plurality of boundary lines, receiving, through the touch screen, an input of a window size change command to change a size of at least one of the plurality of windows, and resizing and displaying at least one of the plurality of windows in correspondence to the window size change command.

16 Claims, 33 Drawing Sheets

Related U.S. Application Data on Dec. 14, 2012, provisional application No. 61/740,887, filed on Dec. 21, 2012.

(51) Int. Cl.
    *G06F 3/0488*     (2013.01)
    *G06F 3/14*     (2006.01)
    *G06F 3/0484*     (2013.01)
    *G06F 9/44*     (2018.01)
    *G09G 5/14*     (2006.01)

(52) U.S. Cl.
    CPC ........ *G06F 3/0481* (2013.01); *G06F 3/04845* (2013.01); *G06F 3/14* (2013.01); *G06F 3/1407* (2013.01); *G06F 9/44* (2013.01); *G06F 9/451* (2018.02); *G09G 5/14* (2013.01); *G06F 2203/04101* (2013.01); *G06F 2203/04104* (2013.01); *G06F 2203/04803* (2013.01); *G06F 2203/04808* (2013.01); *G09G 2354/00* (2013.01)

(56) References Cited

U.S. PATENT DOCUMENTS

| | | | |
|---|---|---|---|
| 2009/0276788 A1* | 11/2009 | Homma | H04N 19/159 718/107 |
| 2010/0007675 A1* | 1/2010 | Kang | G06F 3/04845 345/592 |
| 2011/0105187 A1* | 5/2011 | Dobroth | G06F 3/0481 455/566 |
| 2011/0175930 A1 | 7/2011 | Hwang et al. | |
| 2011/0250930 A1 | 10/2011 | Jung et al. | |
| 2012/0084717 A1* | 4/2012 | Yao | G06F 3/0481 715/792 |
| 2012/0208593 A1 | 8/2012 | Yang et al. | |

FOREIGN PATENT DOCUMENTS

| | | |
|---|---|---|
| CN | 102520928 A | 6/2012 |
| EP | 2 328 062 A2 | 6/2011 |

\* cited by examiner

DISPLAY DEVICE FOR CONTROLLING DISPLAYING OF A WINDOW AND METHOD OF CONTROLLING THE SAME

CROSS-REFERENCE TO RELATED APPLICATION(S)

This application is a U.S. National Stage application under 35 U.S.C. § 371 of an International application filed on Dec. 5, 2013 and assigned application number PCT/KR2013/011219, which claimed the benefit of a U.S. Provisional application filed on Dec. 6, 2012 in the U.S. Patent and Trademark Office and assigned Ser. No. 61/734,097, of a U.S. Provisional application filed on Dec. 14, 2012 in the U.S. Patent and Trademark Office and assigned Ser. No. 61/737,540, of a U.S. Provisional application filed on Dec. 21, 2012 in the U.S. Patent and Trademark Office and assigned Ser. No. 61/740,887, of a Korean patent application filed on Feb. 1, 2013 in the Korean Intellectual Property Office and assigned Serial number 10-2013-0012063, and of a Korean patent application filed on Aug. 8, 2013 in the Korean Intellectual Property Office and assigned Serial number 10-2013-0094070, the entire disclosure of each of which is hereby incorporated by reference.

TECHNICAL FIELD

The present disclosure relates to a display device and a method of controlling the same. More particularly, the present disclosure relates to a display device that controls displaying of a window in which an application is executed, and a method of controlling the display device.

BACKGROUND

A desktop computer has at least one display device (for example, a monitor). A mobile device (for example, a mobile phone, a smart phone, or a tablet Personal Computer (PC)) using a touch screen has one display device.

A user of the desktop computer may divide a screen of the display device according to a working environment (for example, horizontally or vertically divide the screen while displaying a plurality of windows) and use the divided screens. When a web browser is executed, the user can move in an up or down direction of the web page by using a page up button or a page down button arranged in a keyboard. When the user uses a mouse instead of the keyboard, the user can move in the up or down direction of the web page by selecting a scroll bar located in a side part of the web page by using a cursor. Further, the user can move in the up or down direction of the web page by selecting a top button displayed as a text or an icon located in a bottom part of the web page.

The mobile device has a smaller size of the displayed screen in comparison with the desktop computer and a limitation in an input. The user has a difficulty in dividing and then using the mobile device.

Further, the mobile device can execute various applications such as basic applications produced by a manufacturer of the mobile device and then installed in the mobile device and additional applications downloaded from an application selling site through the Internet. The additional applications may be developed by general users and registered in the application selling site. Accordingly, anyone can freely sell applications developed by himself/herself to users of the mobile device through the application selling site. Therefore, tens of thousands to hundreds of thousands of applications are currently provided to the mobile apparatuses free of charge or at a cost according to types of the mobile apparatuses.

Although various applications which simulate consumers' curiosity and satisfy consumers demands are provided to the mobile device, since the mobile device is provided to have a portable size, it has a limitation in a size of a display device and a User Interface (UI) thereof. Accordingly, the users feel it is inconvenient to execute a plurality of applications in the mobile device.

Accordingly, a technology for displaying a plurality of windows on a single display and a technology for easily adjusting a size of the plurality of windows are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device that can easily adjust a size of a plurality of windows on a single display, and a method of controlling the display device.

In accordance with an aspect of the present disclosure, a method of controlling a display device including a touch screen is provided. The method includes displaying, on the touch screen, a plurality of windows respectively corresponding to executing applications, such that the windows do not overlap each other, displaying a plurality of boundary lines differentiating the plurality of windows, and a center button disposed at an intersection point of the plurality of boundary lines, receiving, through the touch screen, an input of a window size change command to change a size of at least one of the plurality of windows, and resizing and displaying at least one of the plurality of windows in correspondence to the window size change command.

In accordance with another aspect of the present disclosure, a display device is provided. The display device includes a touch screen configured to display a plurality of windows respectively corresponding to executing applications, such that the windows do not overlap each other, and to display a plurality of boundary lines differentiating the plurality of windows and a center button disposed at an intersection point of the plurality of boundary lines and a controller configured to resize and control to display at least one of the plurality of windows in correspondence to a window size change command to change a size of at least one of the plurality of windows, when the window size change command is input on the touch screen.

As described above, the present disclosure provides a display device and a method of controlling the display device which can easily adjust a size of a plurality of windows on a single display. Accordingly, a user can adjust the size of the plurality of windows simultaneously or separately so that user convenience can be maximized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
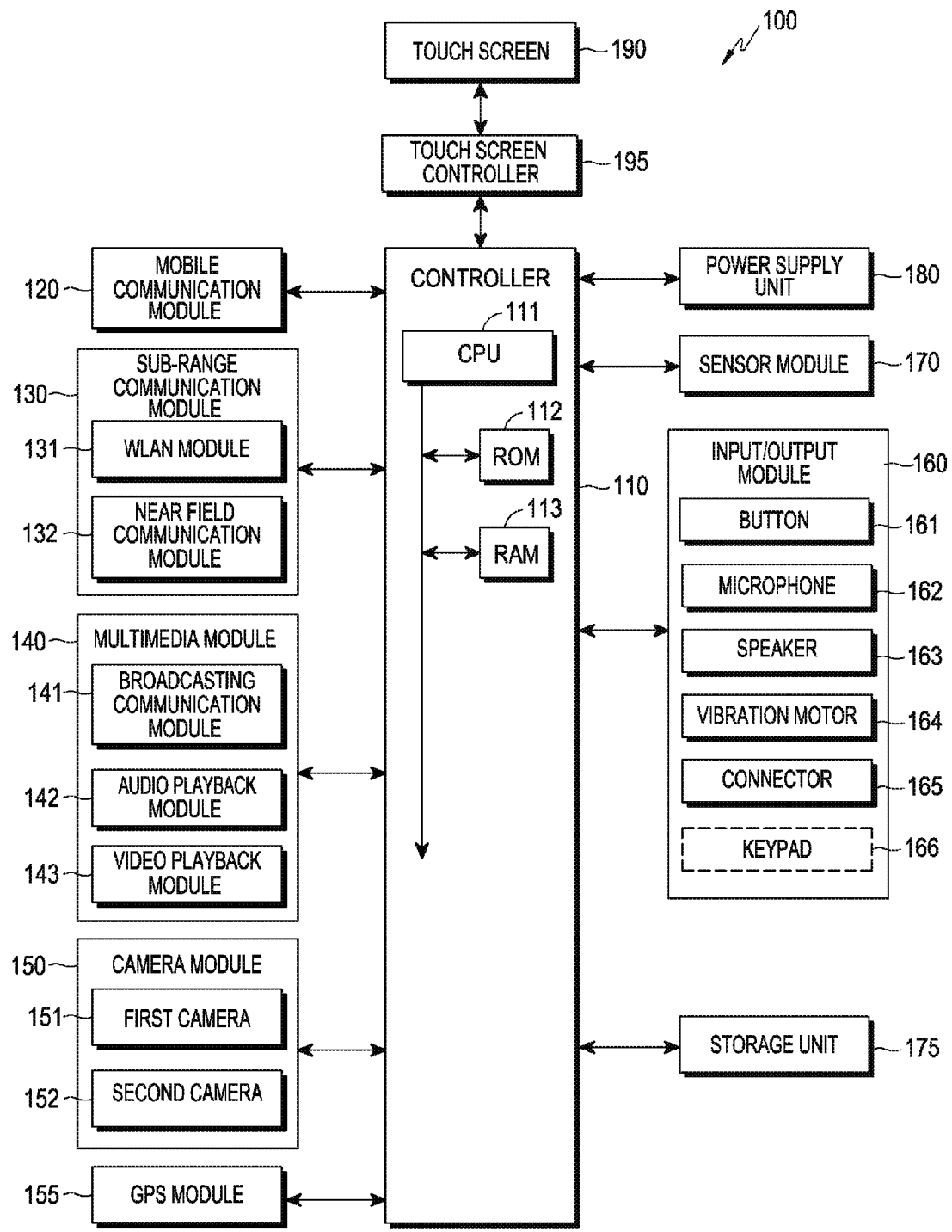
FIG. 1 is a block diagram schematically illustrating a device according to an embodiment of the present disclosure.

FIG. 1 is a block diagram schematically illustrating a device according to an embodiment of the present disclosure.

Referring to FIG. 1, a display device 100 may be connected to an external device (not shown) by using a mobile communication module 120, a sub-range communication module 130, and a connector 165. The "external device" includes a different device (not shown) from the display device 100, a mobile phone (not shown), a smart phone (not shown), a tablet Personal Computer (PC) (not shown), and a server (not shown).

Referring to FIG. 1, the display device 100 includes a touch screen 190 and a touch screen controller 195. Also, the display device 100 includes a controller 110, the mobile communication module 120, the sub-range communication module 130, a multimedia module 140, a camera module 150, a Global Positioning System (GPS) module 155, an input/output module 160, a sensor module 170, a storage unit 175, and a power supply unit 180. The sub-range communication module 130 includes at least one of a Wireless Local Area Network (WLAN) module 131 and a near field communication module 132, and the multimedia module 140 includes at least one of a broadcasting communication module 141, an audio playback module 142, and a video playback module 143. The camera module 150 includes at least one of a first camera 151 and a second camera 152. The input/output module 160 includes at least one of a button 161, a microphone 162, a speaker 163, a vibration motor 164, a connector 165, and a keypad 166.

The controller 110 may include a Central Processing Unit (CPU) 111, a Read-Only Memory (ROM) 112 for storing a control program for controlling the display device 100, and a Random-Access Memory (RAM) 113 for storing a signal or data input from an outside of the display device 100 or used as a storage area for an operation performed in the display device 100. The CPU 111 may include a single core, a dual core, a triple core, or a quad core. The CPU 111, the ROM 112 and the RAM 113 may be connected with each other through internal buses.

The controller 110 may control the mobile communication module 120, the sub-range communication module 130, the multimedia module 140, the camera module 150, the GPS module 155, the input/output module 160, the sensor module 170, the storage unit 175, the power supply unit 180, a touch screen 190, and the touch screen controller 195.

The mobile communication module 120 connects the display device 100 with the external device through mobile communication by using at least one or a plurality of antennas (not shown) according to a control of the controller 110. The mobile communication module 120 transmits/receives a wireless signal for voice phone communication, video phone communication, a Short Message Service (SMS), or a Multimedia Message service (MMS) to/from a mobile phone (not shown), a smart phone (not shown), a tablet PC, or another device (not shown) having a phone number input into the display device 100.

The sub-range communication module 130 may include at least one of the WLAN module 131 and the near field communication module 132. Alternatively or additionally, the sub-range communication module 130 may include other sub-range communication modules, such as Bluetooth. For example, the sub-range communication module 130 may include only the WLAN module 131, only the near field communication module 132, only another sub-range communication module, or any combination of the WLAN module 131, the near field communication module 132, and the other sub-range communication module.

The WLAN module 131 may be connected to the Internet according to the control of the controller 110 in a place where a wireless AP (Access Point) (not illustrated) is installed. The WLAN module 131 supports a wireless LAN standard (IEEE802.11x) of the Institute of Electrical and Electronics Engineers (IEEE). The near field communication module 132 may wirelessly perform near field communication between the display device 100 and a video forming device (not shown) according to a control of the controller 110. The near communication method may include, for example, Bluetooth and Infrared Data Association (IrDA) communication.

The display device 100 may include at least one of the mobile communication module 120, the WLAN module 131, and the near field communication module 132. For example, the display device 100 may include a combination of the mobile communication module 120, the WLAN module 131, and the near field communication module 132 according to a capability of the display device 100.

The multimedia module 140 may include the broadcasting communication module 141, the audio playback module 142, or the video playback module 143. The broadcasting communication module 141 may receive a broadcasting signal (e.g., a Television (TV) broadcasting signal, a radio broadcasting signal or a data broadcasting signal) which is transmitted from a broadcasting station or broadcasting added information (e.g., Electric Program Guide (EPG) or Electric Service Guide (ESG) through a broadcasting communication antenna (not illustrated) according to the control of the controller 110. The audio playback module 142 may reproduce a stored or received digital audio file (e.g., a file of which the file extension is mp3, wma, ogg, or wav) according to the control of the controller 110. The video playback module 143 may reproduce a stored or received digital moving image file (e.g., a file of which the file extension is mpeg, mpg, mp4, avi, mov, or mkv) according to the control of the controller 110. The video playback module 143 may reproduce a digital audio file.

The multimedia module 140 may include the audio playback module 142 and the video playback module 143 except for the broadcasting communication module 141. Also, the audio playback module 142 or the video playback module 143 of the multimedia module 140 may be included in the controller 110.

The camera module 150 may include at least one of the first camera 151 and the second camera 152 each of which photographs a still image or a moving image according to the control of the controller 110. In addition, the first camera 151 or the second camera 152 may include an auxiliary light source (e.g. a flash (not illustrated)) that provides an amount of light required for photographing. The first camera 151 may be disposed in a front surface of the display device 100, and the second camera 152 may be disposed in a rear surface of the display device 100. In a different way, the first camera 151 and the second camera 152 may be disposed to be adjacent to each other (for example, an interval between the first camera 151 and the second camera 152 is larger than 1 cm or smaller than 8 cm), and thus a three-dimensional still image or a three-dimensional video may be photographed.

The GPS module 155 may receive a radio wave from a plurality of GPS satellites (not shown) in Earth orbit and calculate a position of the display device 100 by using Time of Arrival from the GPS satellites (not shown) to the display device 100.

The input/output module 160 may include at least one of a plurality of buttons 161, a microphone 162, a speaker 163, a vibration motor 164, a connector 165, and a keypad 166.

The buttons 161 may be formed in a front surface, a side surface, or a rear surface of the housing of the display device 100, and may include at least one of a power/lock button (not shown), a volume button (not shown), a menu button, a home button, a back button, and a search button.

The microphone 162 receives a voice or a sound to generate an electrical signal according to a control of the controller 110.

The speaker 163 may output sounds corresponding to various signals (for example, a wireless signal, a broadcasting signal, a digital audio file, a digital video file, photographing a picture or the like) of the mobile communication module 120, the sub-range communication module 130, the multimedia module 140, or the camera module 150 to an outside of the display device 100 according to a control of the controller 110. The speaker 163 may output sounds (for example, a button control sound or a ring back tone corresponding to phone communication) corresponding to functions performed by the display device 100. One or more speakers 163 may be formed in a proper position or positions of the housing of the display device 100.

The vibration motor 164 may convert an electronic signal to mechanical vibration according to the control of the controller 110. For example, when the display device 100 in a vibration mode receives voice phone communication from another device (not shown), the vibration motor 164 operates. One or more vibration motors 164 may be formed within the housing of the display device 100. The vibration motor 164 may be operated in response to a user's touch action that touches the touch screen 190 and a continuous touch movement on the touch screen 190.

The connector 165 may be used as an interface for connecting the display device 100 with an external device (not shown) or a power source (not shown). The connector 165 may transmit data stored in the storage unit 175 of the display device 100 to the external device (not shown) through a wired cable connected to the connector 165 or receive the data from the external device (not shown) according to a control of the controller 110. The display device 100 may receive power from a power source (not illustrated) through the wired cable connected to the connector 165 or charge a battery (not illustrated using the power source).

The keypad 166 may receive a key input from the user to control the display device 100. The keypad 166 includes a physical keypad (not shown) formed in the display device 100 or a virtual keypad (not shown) displayed on the touch screen 190. The physical keypad (not shown) formed in the display device 100 may be omitted according to a capability or a structure of the display device 100.

The sensor module 170 includes at least one sensor for detecting a state of the display device 100. For example, the sensor module 170 may include a proximity sensor for detecting whether the user is close to the display device 100, an illumination sensor (not shown) for detecting an amount of light adjacent to the display device 100, or a motion sensor (not shown) for detecting an operation of the display device 100 (for example, a rotation of the display device 100, or an acceleration or vibration applied to the display device 100). At least one sensor may detect the state, generate a signal corresponding to the detection, and transmit the generated signal to the controller 110. The sensor of the sensor module 170 may be added or omitted according to a capability of the display device 100.

The storage unit 175 may store signals or data input/output in response to the operations of the mobile communication module 120, the sub-range communication module 130, the multimedia module 140, the camera module 150, the GPS module 155, the input/output module 160, the sensor module 170, and the touch screen 190 according to the control of the controller 110. The storage unit 175 may store a control program for controlling the display device 100 or the controller 110 and applications.

The term "storage unit" includes a memory card (not shown) (for example, an Secure Digital (SD) card or a memory stick) mounted to the storage unit 175, the ROM 112 or the RAM 113 within the controller 110, or the display device 100. The storage unit may include a non-volatile memory, a volatile memory, a Hard Disc Drive (HDD) or a Solid State Drive (SSD).

The power supply unit 180 may supply power to one battery or a plurality of batteries (not shown) disposed in the housing of the display device 100 according to a control of the controller 110. The one battery or the plurality of batteries (not shown) supply power to the display device 100. Further, the power supply unit 180 may supply power input from an external power source (not shown) through the wired cable connected to the connector 165 to the display device 100.

The touch screen 190 may provide a user interface corresponding to various services (for example, phone communication, data transmission, broadcasting, and photographing a picture) to the user. The touch screen 190 may transmit an analog signal corresponding to at least one touch input into the user interface to the touch screen controller 195. The touch screen 190 may receive at least one touch through a body part of the user (for example, fingers including a thumb) or a touchable input means. Also, the touch screen 190 may receive a continuous motion of one touch among at least one touch. The touch screen 190 may transmit an analogue signal corresponding to the continuous movement of the touch input thereto to the touch screen controller 195.

The touch according to the present disclosure is not limited to a touch between the touch screen 190 and the body part of the user or the touchable input means, but may include a non-touch (for example, a case where a detectable interval between the touch screen 190 and the body part of the user or the touchable input means is equal to or smaller than 1 mm). The detectable interval of the touch screen 190 may be changed according to a capability of a structure of the display device 100.

The touch screen 190 may be implemented in, for example, a resistive type, a capacitive type, an infrared type, or an acoustic wave type.

The touch screen controller 195 converts the analog signal received from the touch screen 190 to a digital signal (for example, X and Y coordinates) and transmits the digital signal to the controller 110. The controller 110 may control the touch screen 190 by using the digital signal received from the touch screen controller 195. For example, the controller 110 may allow a shortcut execution icon (not shown) displayed on the touch screen 190 to be selected or executed in response to the touch. Further, the touch screen controller 195 may be included in the controller 110.

FIGS. 2A to 2E illustrate a display device according to various embodiments of the present disclosure.

It will be understood by those skilled in the art that a display device 200 may be implemented in various forms such as an ordinary TV, an internet TV, and a medical data display device, as well as the mobile device described above in relation to FIG. 1. Namely, any device provided with a unit capable of displaying a rendered image may be used as the display device without limitation.

Figure 2A:
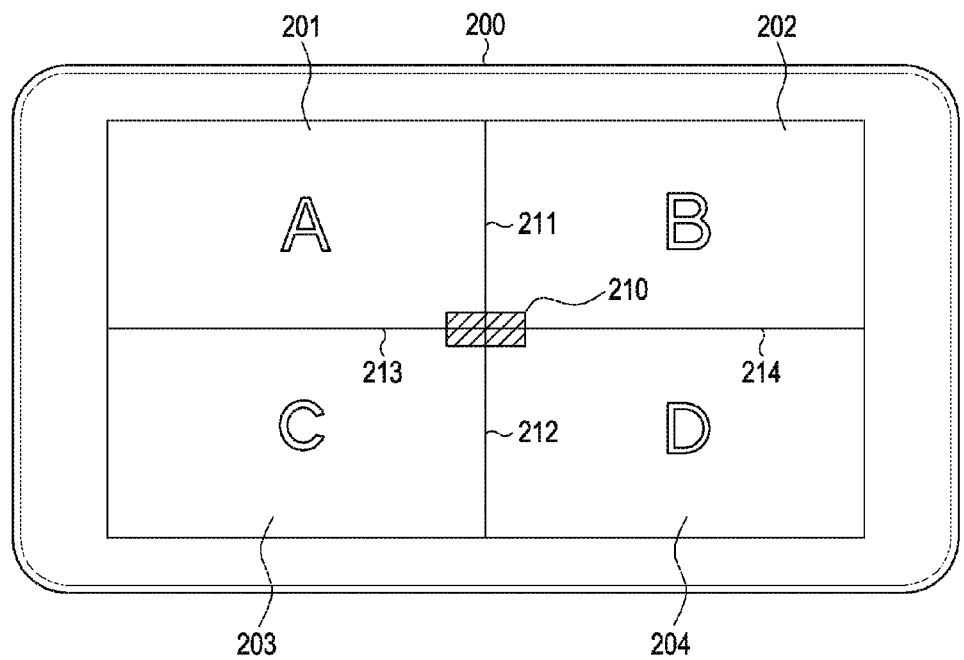
FIGS. 2A, 2B, 2C, 2D, and 2E illustrate a display device according to various embodiments of the present disclosure.

FIG. 2A illustrates a display device according to an embodiment of the present disclosure. A touch screen of the display device is divided into four areas, and different windows are displayed in the respective areas. A controller (not illustrated) of the display device 200 may set a layout such that a screen is divided into four equal areas. More specifically, the controller (not illustrated) may set first, second, third, and fourth areas. The controller (not illustrated) may set a first boundary line 211 between the first and second areas, a second boundary line 212 between the third and fourth areas, a third boundary line 213 between the first and third areas, and a fourth boundary line 214 between the second and fourth areas. Here, the first and second boundary lines 211 and 212 may configure one line segment, and the third and fourth boundary lines 213 and 214 may configure one line segment. The controller (not illustrated) sets the first to fourth areas not to overlap each other. For example, referring to FIG. 2A, the controller (not illustrated) sets the first area on an upper left side of the screen, the second area on an upper right side of the screen, the third area on a lower left side of the screen, and the fourth area on a lower right side of the screen. The controller (not illustrated) sets the first and second boundary lines 211 and 212 to divide the screen into left and right areas, and sets the third and fourth boundary lines 213 and 214 to divide the screen into upper and lower areas.

The controller (not illustrated) displays windows for executing an application in the respective areas. For example, the controller (not illustrated) displays a first window 201 for executing an application A in the first area, a second window 202 for executing an application B in the second area, a third window 203 for executing an application C in the third area, and a fourth window 204 for executing an application D in the fourth area.

Meanwhile, the controller (not illustrated) displays a center button 210 at a point where the first and second boundary lines 211 and 212 intersect with the third and fourth boundary lines 213 and 214. The center button 210 will be described below more specifically.

The window may be an area including an execution screen of a particular application, a title bar for the executed application, and a control area. Objects related to the application may be displayed on the execution screen of the application. The objects may be formed in various shapes such as a text, a figure, an icon, a button, a check box, a picture, a video, a web, a map and the like. When a user touches the corresponding object, a predetermined function or event for the object may be performed in a corresponding application. The object may be referred to as a view according to an operating system. The title bar may include at least one control key for controlling a display of the window. For example, the control key may be a window display minimizing button, a window display maximizing button, or a window closing button.

Meanwhile, applications are programs independently implemented by a manufacturer of the display device 200 or an application developer. Accordingly, a pre-execution of one application is not required to execute another application. Further, although one application ends, another application can be continuously executed.

The applications are distinguished from a complex function application (or a dual application) generated by adding some functions (a memo function and a message transmission/reception function) provided by one application to functions of another application in that the applications are independently implemented programs. However, the complex function application is a single application newly produced to have various functions and thus has differences from conventional applications. Accordingly, the complex function application provides only limited functions, without providing various functions like the conventional applications. Further, users have the burden of separately purchasing such a new complex function application.

Figure 2B:
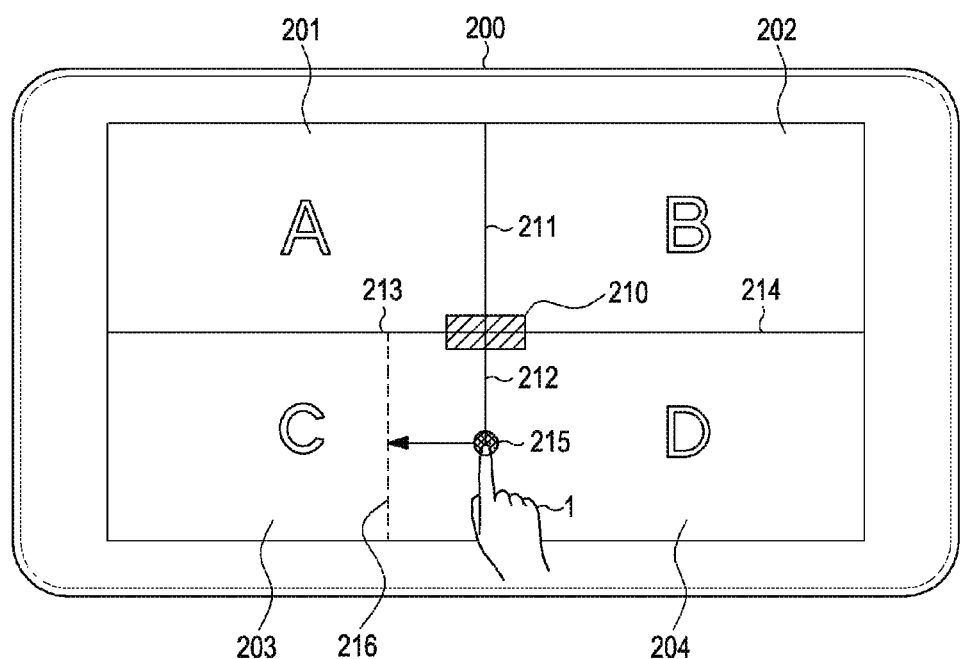

Referring to FIG. 2B, a user 1 may increase a size of the fourth window 204 for executing the application D. For example, the user 1 may touch the second boundary line 212 and then may input a window size change command 215 to drag the second boundary line 212 leftward to a first end point 216. The controller (not illustrated) may determine in correspondence to the drag gesture input on the touch screen that the window size change command 215 has been input. The controller (not illustrated) analyzes the input window size change command 215, and resizes and displays the windows. For example, the controller (not illustrated) may control such that the third and fourth areas are displayed while a horizontal length of the third area is decreased and a horizontal length of the fourth area is increased by the input window size change command 215. More specifically, the controller (not illustrated) may determine, based on the fact that a start point of the drag gesture is on the second boundary line 212, that the window size change command 215 to change the horizontal lengths of the third and fourth areas has been input. Further, the controller (not illustrated) may determine, based on the fact that the drag gesture is made leftward, that the window size change command 215 to decrease the horizontal length of the third area and increase the horizontal length of the fourth area has been input. In addition, the controller (not illustrated) may determine a degree of a change in the window size by the window size change command 215, based on a location of the end point 216 of the drag gesture. As described above, the controller (not illustrated) may determine, based on the input window size change command 215, at least one of a target window to be changed in size, a change in a horizontal or vertical length of the corresponding window, and a degree of the change. Table 1 illustrates a change in a window size according to a window size change command.

TABLE 1

| Drag start point | Drag direction | Change in Window size |
|---|---|---|
| 1st Boundary line | Leftward | Decrease in horizontal length of 1st area & Increase in horizontal length of 2nd area |
|  | Rightward | Increase in horizontal length of 1st area & Decrease in horizontal length of 2nd area |
| 2nd Boundary line | Leftward | Decrease in horizontal length of 3rd area & Increase in horizontal length of 4th area |
|  | Rightward | Increase in horizontal length of 3rd area & Decrease in horizontal length of 4th area |
| 3rd Boundary line | Upward | Decrease in vertical length of 1st area & Increase in vertical length of 3rd area |
|  | Downward | Increase in vertical length of 1st area & Decrease in vertical length of 3rd area |

TABLE 1-continued

| Drag start point | Drag direction | Change in Window size |
|---|---|---|
| 4th Boundary line | Upward | Decrease in vertical length of 2nd area & Increase in vertical length of 4th area |
|  | Downward | Increase in vertical length of 2nd area & Decrease in vertical length of 4th area |

Figure 2C:
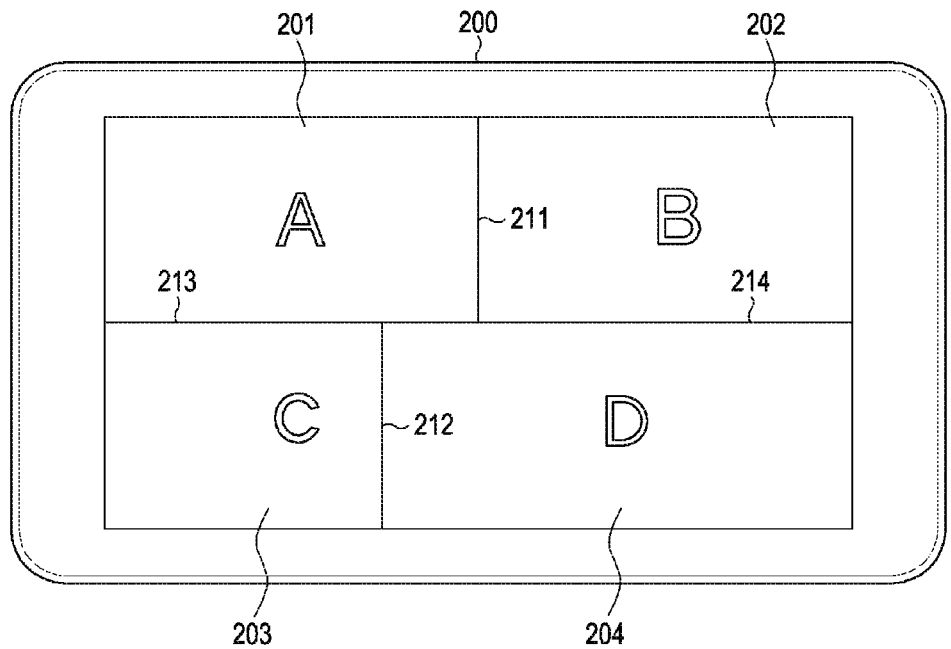

When analyzing the window size change command, the controller (not illustrated) may change the horizontal lengths of the third and fourth windows 203 and 204 based on the window size change command, and may display the third and fourth windows 203 and 204, as illustrated in FIG. 2C. More specifically, the controller (not illustrated) may reset the second boundary line 212 to the end point 216 of the drag gesture 215 input by the user 1. The controller (not illustrated) may change the horizontal lengths of the third and fourth windows 203 and 204 based on the second boundary line 212, and may display the third and fourth windows 203 and 204. Meanwhile, the controller (not illustrated) displays the third window 203 in the size-changed third area and the fourth window 204 in the size-changed fourth area. In this case, the controller (not illustrated) resizes and displays the third window 203, namely, an execution screen of the application C in correspondence to the size-changed third area. The controller (not illustrated) resizes and displays the fourth window 204, namely, an execution screen of the application D in correspondence to the size-changed fourth area. For example, the controller (not illustrated) may display the execution screen of the application C in the entire third area. In this case, the controller (not illustrated) may reduce and display the execution screen of the application C in the same rate as the third area. Further, the controller (not illustrated) may display only a portion of the execution screen of the application C. For example, the controller (not illustrated) may display only a right side portion of the execution screen of the application C, thereby creating an effect that the application C is pushed to a left side. Furthermore, the controller (not illustrated) may also display the third window 203 at a portion of the third area, while maintaining a horizontal to vertical ratio of the execution screen of the application C. The controller may leave the remaining area of the third area empty, in which the third window 203 is not displayed in the remaining area. Moreover, the controller (not illustrated) may change the execution screen of the application to another screen, and may display the other screen. The controller (not illustrated) may also change and display the execution screen of the application in correspondence to an area reduced or enlarged in various ways. This will be described below more specifically.

Meanwhile, the controller (not illustrated) may form a view having a predetermined thickness while the boundary line serving as a center line of the thickness, and may control such that the view is not displayed. Since the boundary line is displayed as a line, it may be difficult to determine whether the boundary line is touched. Accordingly, when the view having the predetermined thickness is touched, the controller (not illustrated) may determine that the boundary line is touched.

As described above, the display device 200 provides a function of making the user 1 change the size of the two areas simultaneously and easily.

Figure 2D:
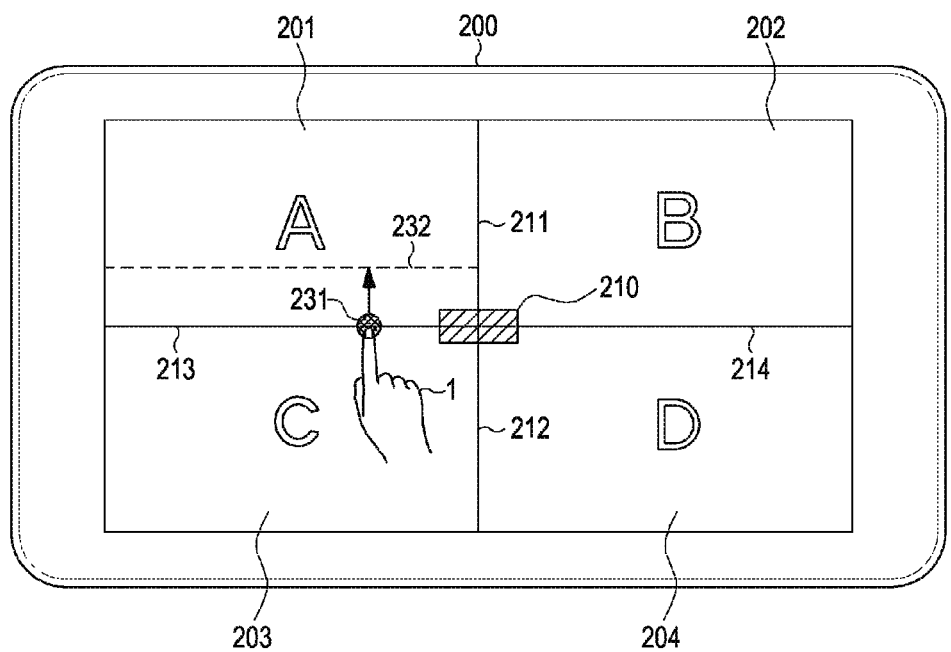
Figure 2E:
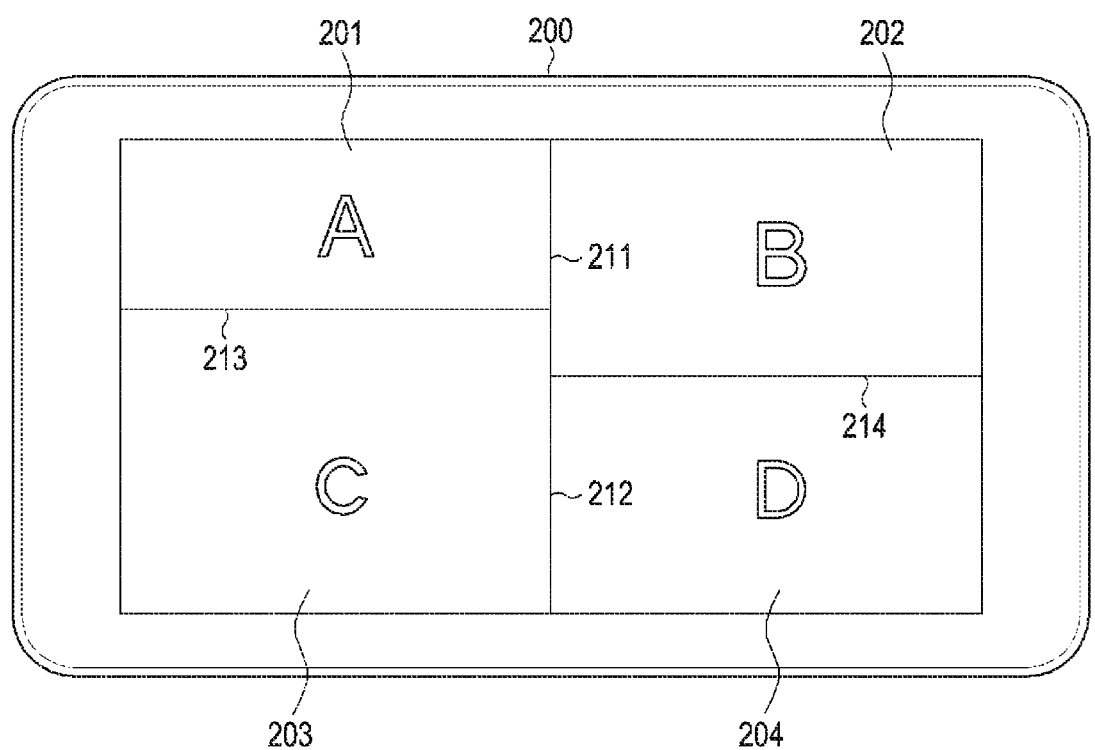

FIGS. 2D and 2E illustrate a process of changing a window size according to another embodiment of the present disclosure.

Referring to FIG. 2D, a user 1 may input a window size change command 231 on a touch screen. In the embodiment of FIG. 2D, the window size change command 231 may be an upward drag gesture from a third boundary line 213 to a second end point 232.

The controller (not illustrated) may analyze the input window size change command 231, and may control such that first and third areas are displayed as illustrated in FIG. 2E while a vertical length of the first area is decreased and a vertical length of the third area is increased. The controller (not illustrated) resizes and displays first and third windows 201 and 203 in correspondence to the changed window display spaces.

Further, the controller (not illustrated) may set the third boundary line 213 as the second end point 232 to change the size of the first and third areas.

Figure 3A:
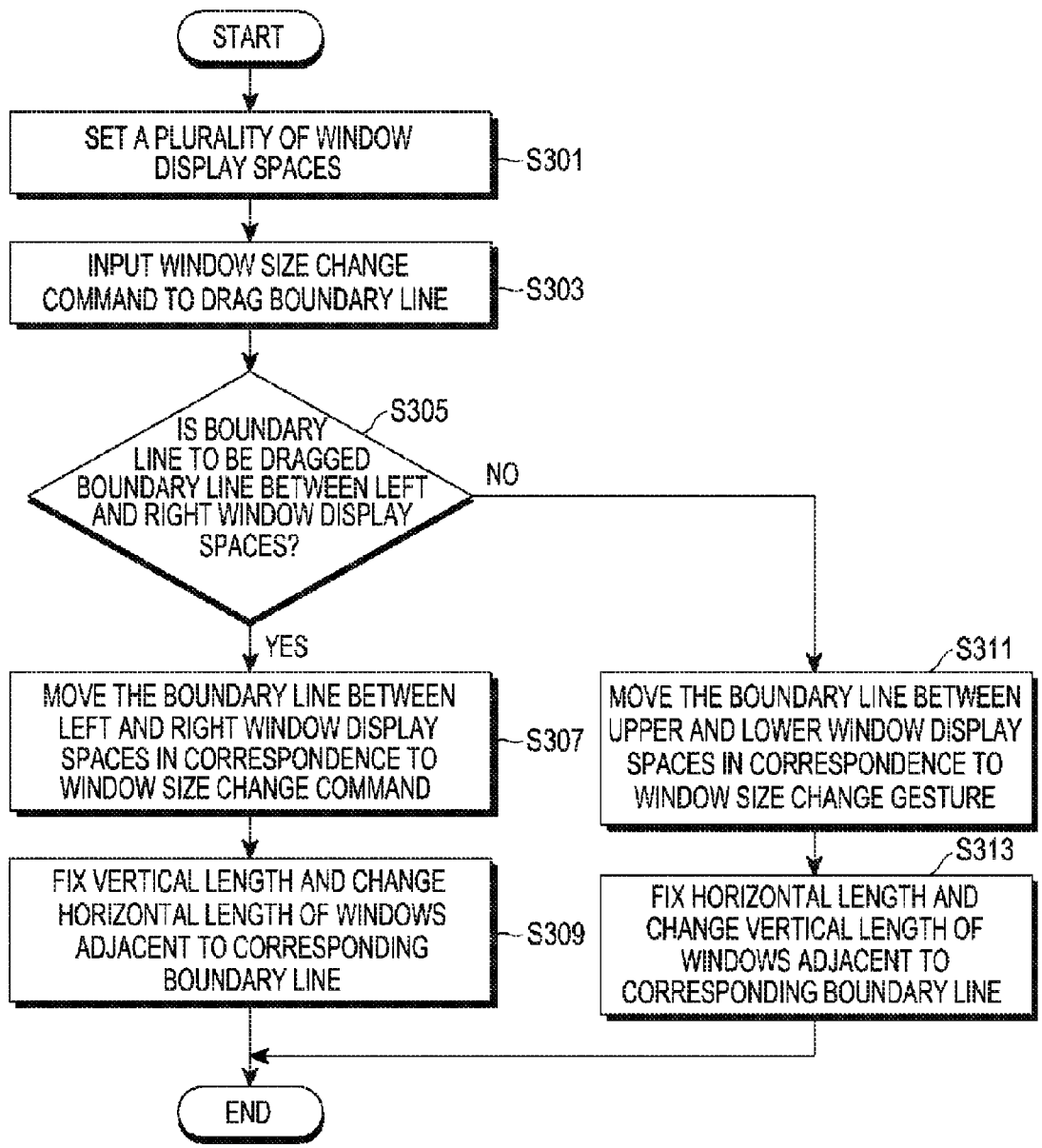
FIGS. 3A and 3B are flowcharts illustrating a method of controlling a display device according to various embodiments of the present disclosure.

FIG. 3A is a flowchart illustrating a method of controlling a display device according to an embodiment of the present disclosure.

The display device may set a plurality of window display spaces such as, for example, first to fourth areas of FIG. 2A to display a plurality of windows, in operation S301. The display device may set, for example, at least one boundary line, and thereby may set the plurality of window display spaces.

When the plurality of window display spaces are set, the display device may receive an input of a window size change command to drag the boundary line, in operation S303. The display device may determine in operation S305 whether a starting boundary line for the drag is a boundary line between left and right window display spaces or a boundary line between upper and lower window display spaces. When the starting boundary line for the drag is the boundary line between the left and right window display spaces (S305-Y), the display device may move the boundary line between the left and right window display spaces to an end point of the drag, in operation S307. In addition, the display device may change a horizontal length of the window display spaces in operation S309, while a vertical length of the window display spaces adjacent to the corresponding boundary line is fixed. For example, the display device may decrease a horizontal length of a first window adjacent to the corresponding boundary line, and at the same time, may increase a horizontal length of a second window adjacent to the corresponding boundary line. When the starting boundary line for the drag is the boundary line between the upper and lower window display spaces (S305-Y), the display device may move the boundary line between the upper and lower window display spaces to the end point of the drag, in operation S311. Further, the display device may change a vertical length of the window display spaces in operation S313, while a horizontal length of the window display spaces adjacent to the corresponding boundary line is fixed. For example, the display device may decrease a vertical length of a first window adjacent to the corresponding boundary line, and at the same time, may increase a vertical length of a second window adjacent to the corresponding boundary line.

Figure 3B:
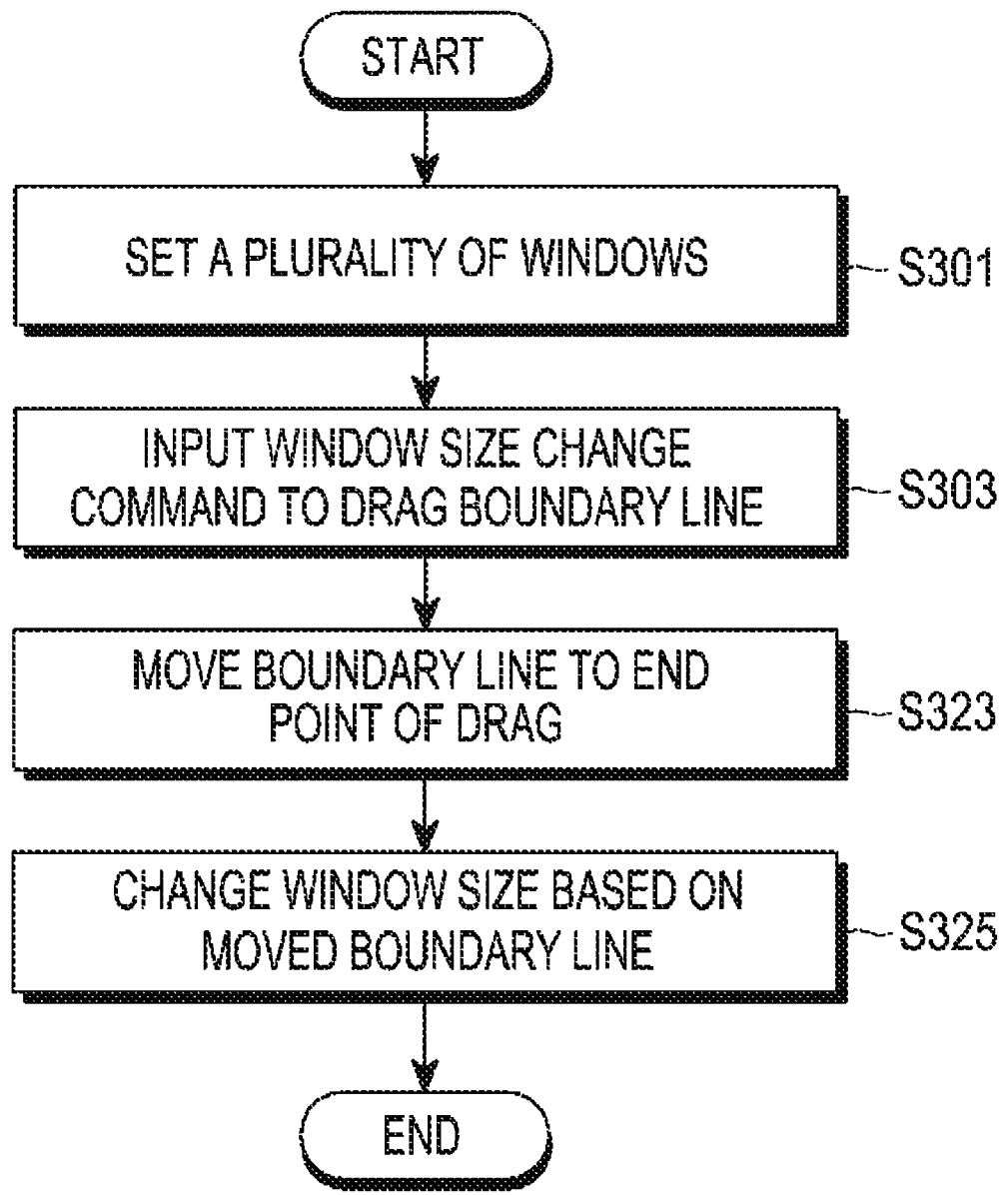

FIG. 3B is a flowchart illustrating a method of controlling a display device according to another embodiment of the present disclosure. Since the operations S301 and S303 have been described above with reference to FIG. 3A, descriptions thereof will be omitted below.

The display device may move the corresponding boundary line to an end point of the drag, in operation S323. After moving the corresponding boundary line, the display device may change a size of window display spaces based on the moved boundary line, in operation S325. Namely, unlike the embodiment of FIG. 3A, the display device may reset the window display spaces based on at least one boundary line after the movement of the boundary line. The display device displays windows in the reset window display spaces, respectively.

FIGS. 4A to 4G illustrate a process of changing a window size according to another embodiment of the present disclosure.

Figure 4A:
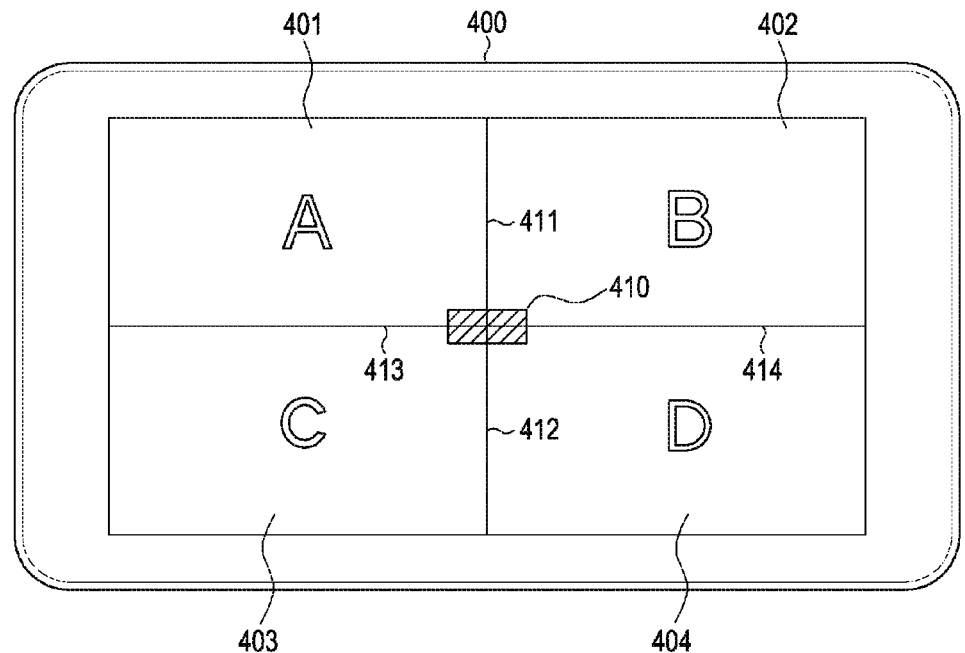
FIGS. 4A, 4B, 4C, 4D, 4E, 4F, and 4G illustrate a process of changing a window size according to another embodiment of the present disclosure.

FIG. 4A illustrates a display device according to an embodiment of the present disclosure. A touch screen of the display device is divided into four areas, and different windows are displayed in the respective areas. A controller (not illustrated) of the display device 400 may set a layout such that a screen is divided into four equal areas. More specifically, the controller (not illustrated) may set first, second, third, and fourth areas. The controller (not illustrated) may set a first boundary line 411 between the first and second areas, a second boundary line 412 between the third and fourth areas, a third boundary line 413 between the first and third areas, and a fourth boundary line 414 between the second and fourth areas.

The controller (not illustrated) displays windows for executing an application in the respective areas. For example, the controller (not illustrated) displays a first window 401 for executing an application A in the first area, a second window 402 for executing an application B in the second area, a third window 403 for executing an application C in the third area, and a fourth window 404 for executing an application D in the fourth area.

Meanwhile, the controller (not illustrated) displays a center button 410 at a point where the first and second boundary lines 411 and 412 intersect with the third and fourth boundary lines 413 and 414.

Figure 4B:
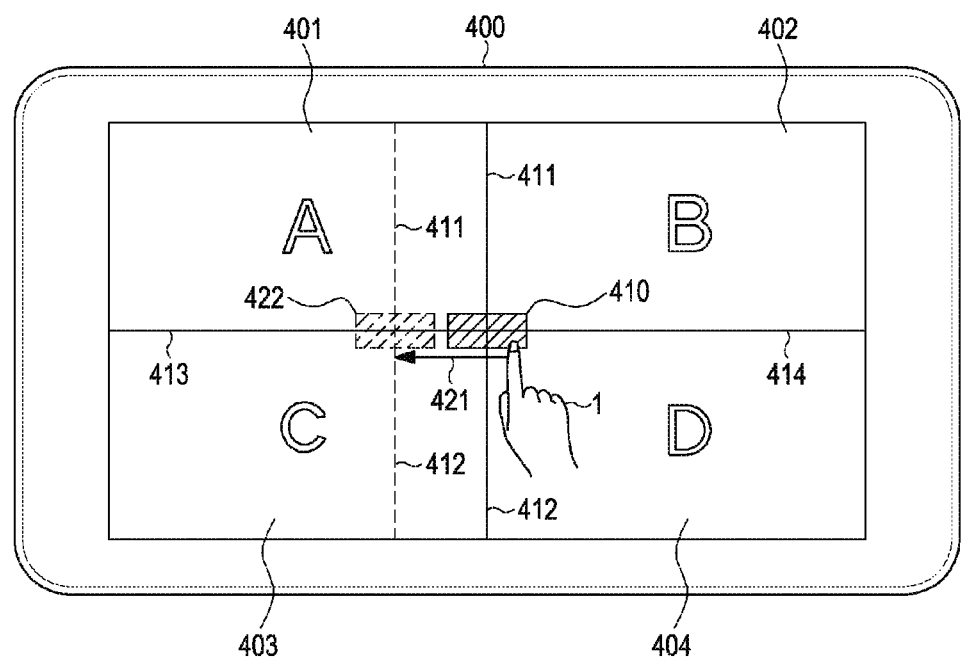
Figure 4C:
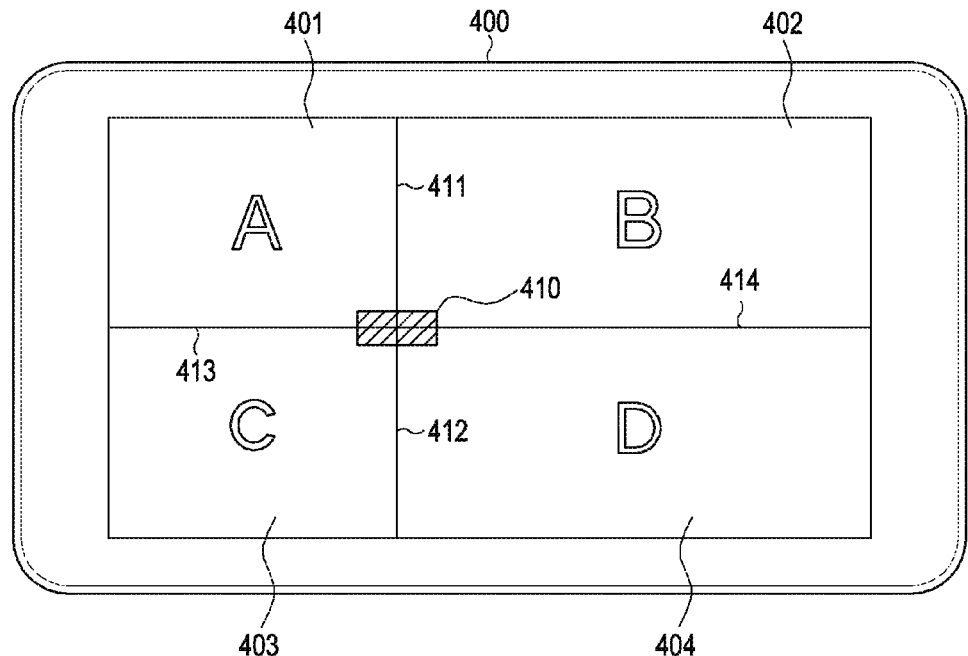

Referring to FIG. 4B, a user 1 may input, as a window size change command, a leftward drag gesture 421 from the center button 410 to a first end point 422. Referring to FIG. 4C, the controller (not illustrated) may change a location of the center button 410 to the first end point 422, and may display the center button 410. In addition, the controller (not illustrated) may reset and display the boundary lines 411 to 414 based on the center button 410. For example, the controller (not illustrated) resets the first boundary line 411 from the center button 410 to an upper side, the second boundary line 412 from the center button 410 to a lower side, the third boundary line 413 from the center button 410 to a left side, and the fourth boundary line 414 from the center button 410 to a right side. Further, the controller (not illustrated) resizes and displays the first to fourth areas 401, 402, 403, and 404 based on the reset boundary lines 411 to 414. Namely, in contrast to the embodiment of FIG. 2C, a size of all the window display areas may be changed together in the embodiment of FIG. 4B.

Figure 4D:
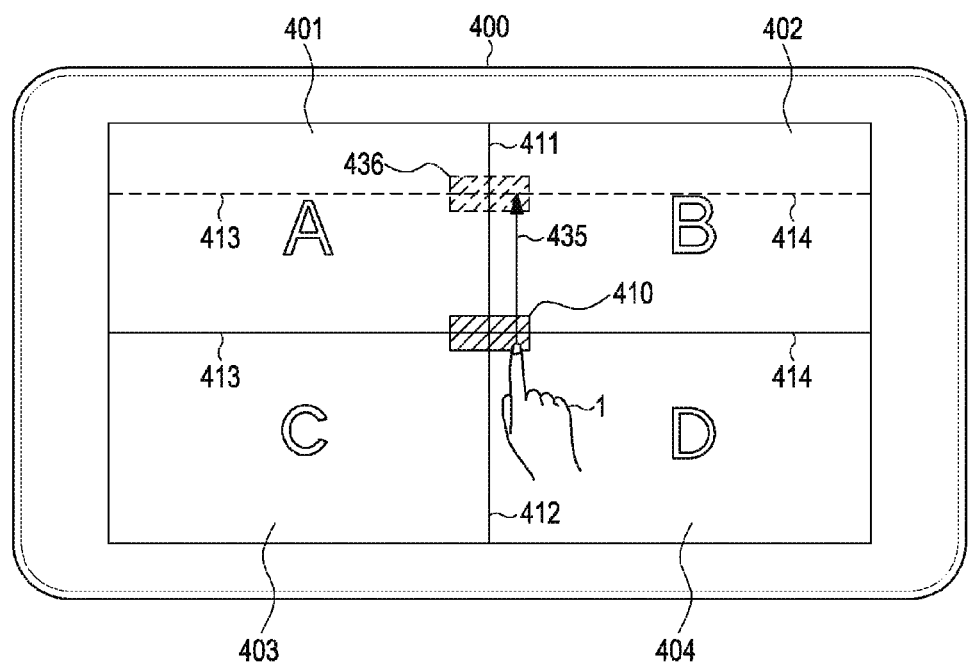

FIG. 4D illustrates a method of changing a window size according to another embodiment of the present disclosure.

Figure 4E:
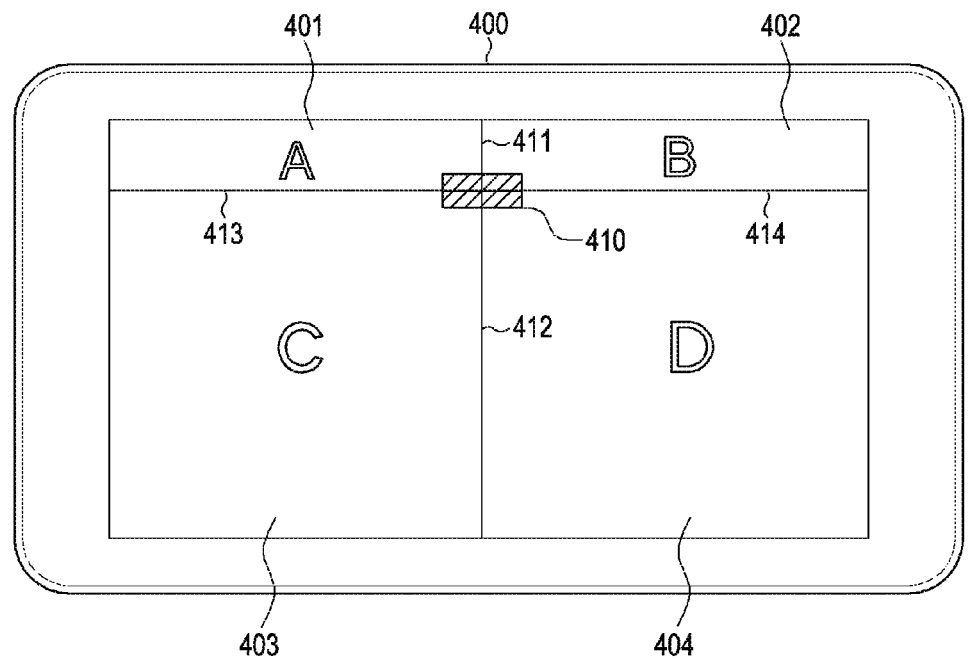

Referring to FIG. 4D, a user may input, as a window size change command, an upward drag gesture 435 from the center button 410 to a second end point 436. Referring to FIG. 4E, the controller (not illustrated) may change a location of the center button 410 to the second end point 436, and may display the center button 410. In addition, the controller (not illustrated) may reset and display the boundary lines 411 to 414 based on the center button 410. The controller (not illustrated) resizes and displays the first to fourth areas 401, 402, 403, and 404 based on the reset boundary lines 411 to 414.

Figure 4F:
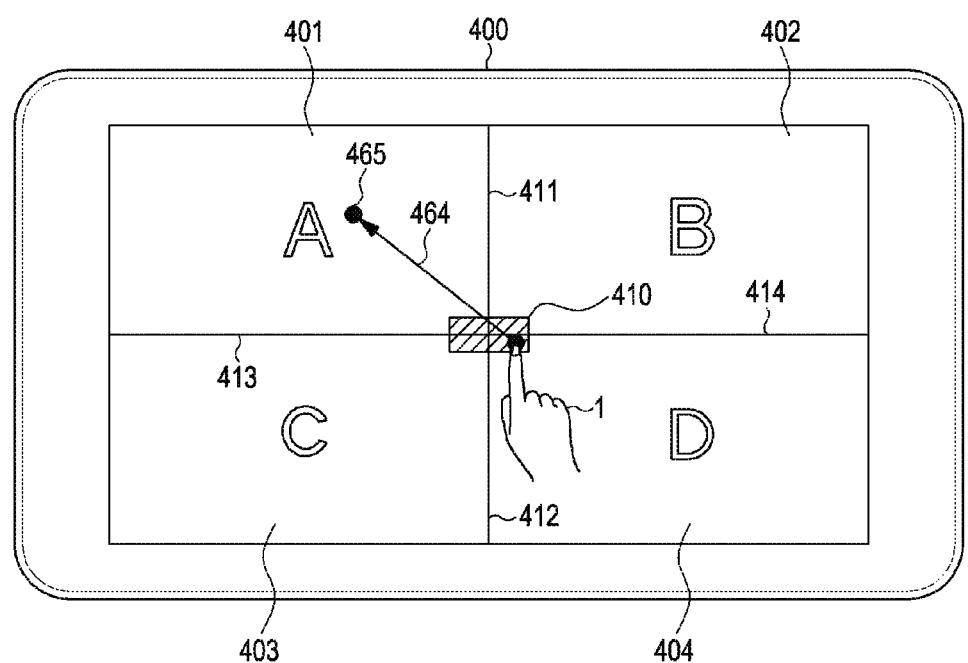

FIG. 4F illustrates a method of changing a window size according to another embodiment of the present disclosure.

Figure 4G:
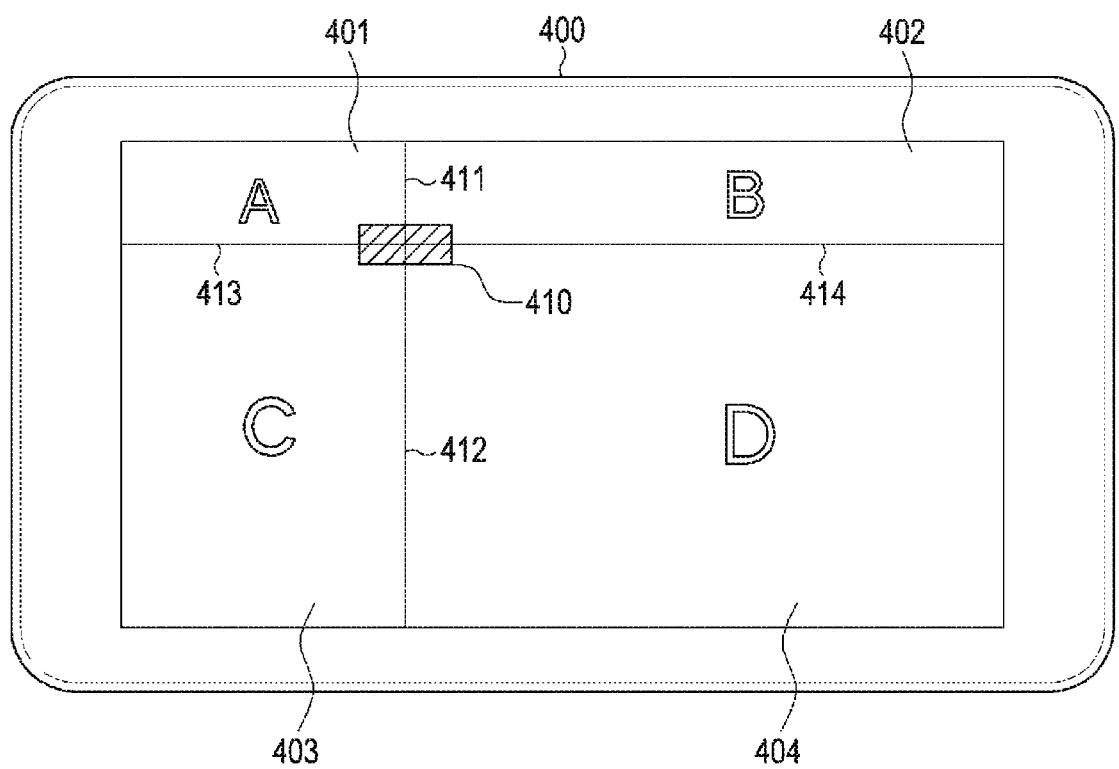

Referring to FIG. 4F, a user may input, as a window size change command, an upper-left drag gesture 464 from the center button 410 to a third end point 465. Referring to FIG. 4G, the controller (not illustrated) may change a location of the center button 410 to the third end point 465, and may display the center button 410. In addition, the controller (not illustrated) may reset and display the boundary lines 411 to 414 based on the center button 410. The controller (not illustrated) resizes and displays the first to fourth areas based on the reset boundary lines 411 to 414. Further, the controller (not illustrated) may resize and display windows in correspondence to a size of the reset first to fourth areas 401, 402, 403, and 404.

Figure 5:
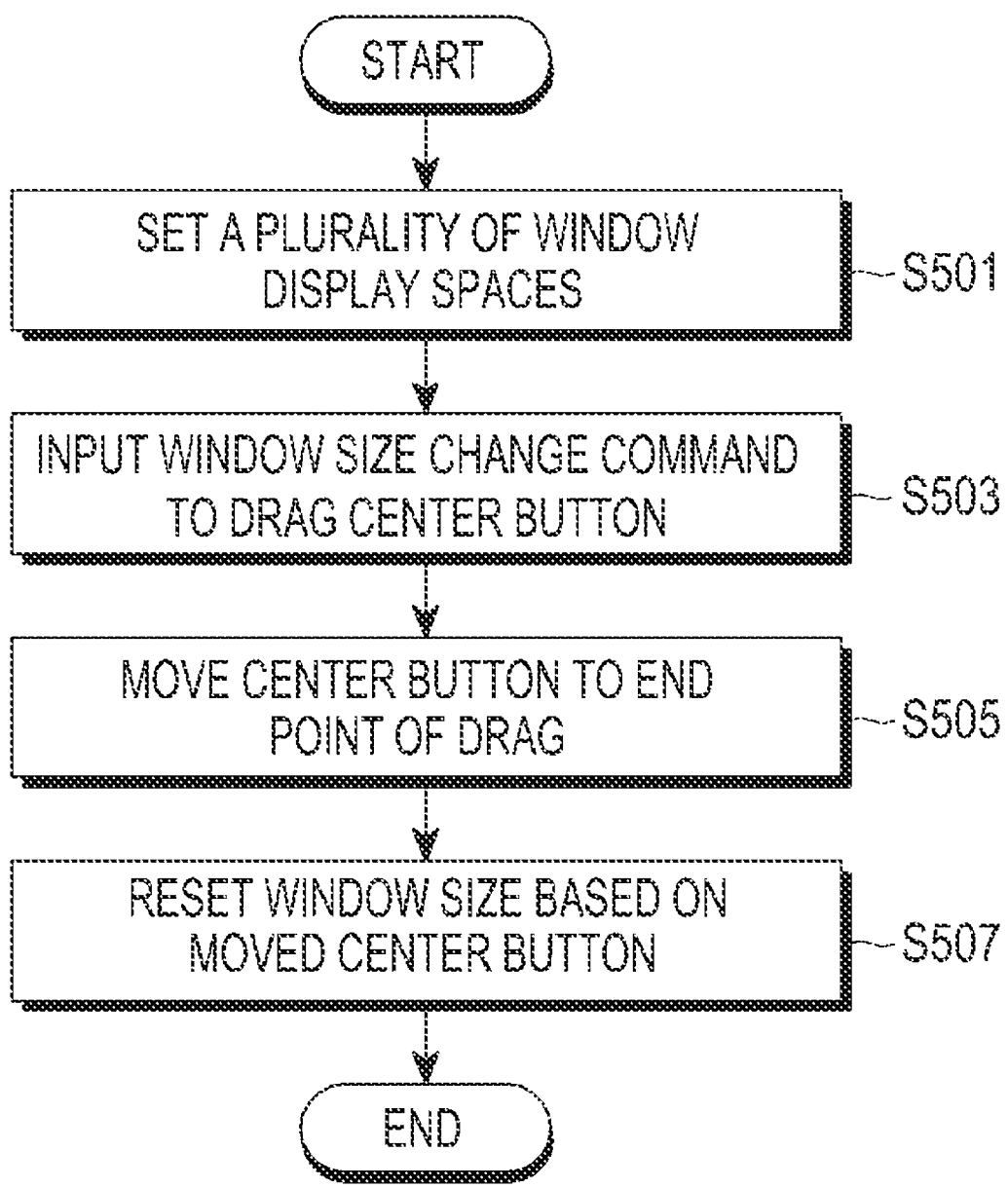
FIG. 5 is a flowchart illustrating a method of changing a window size according to an embodiment of the present disclosure.

FIG. 5 is a flowchart illustrating a method of changing a window size according to an embodiment of the present disclosure.

The display device may set a plurality of window display spaces such as, for example, first to fourth areas of FIG. 4A to display a plurality of windows, in operation S501. The display device may set, for example, at least one boundary line, and thereby may set the plurality of window display spaces. Here, a center button may be formed at an intersecting point of the at least one boundary line.

When the plurality of window display spaces are set, the display device may receive an input of a window size change command to drag the center button, in operation S503. The display device moves the center button to an end point of the drag, and thereafter resets boundary lines based on the moved center button, in operation S505. The display device resets a size of the windows based on the at least one reset boundary line, and then displays the windows, in operation S507.

Figure 6A:
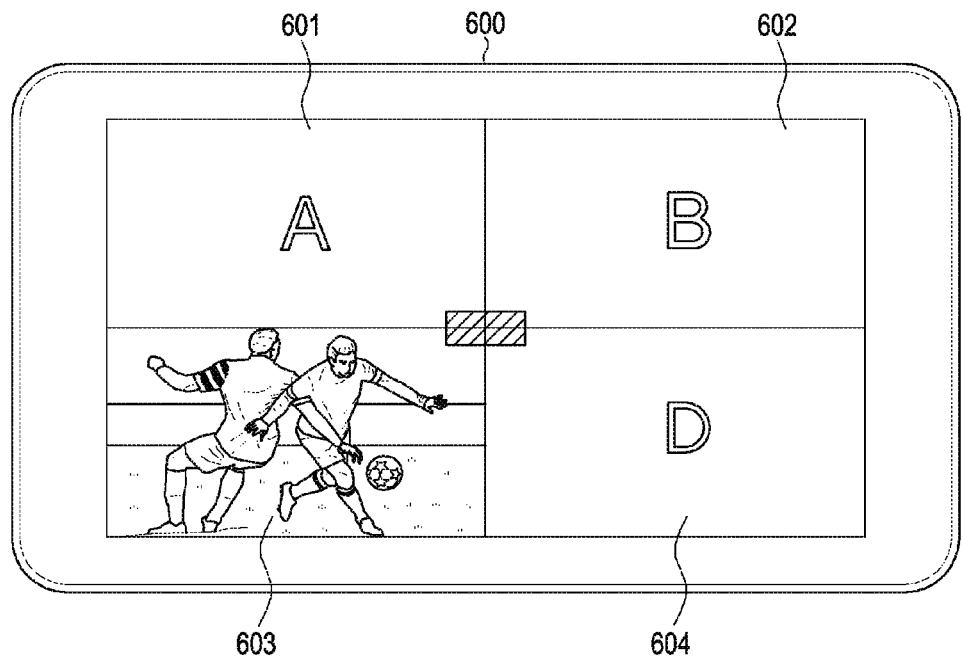
FIGS. 6A, 6B, 6C, 6D, 6E, and 6F illustrate cases in which a screen is reduced according to various embodiments of the present disclosure.
Figure 6B:
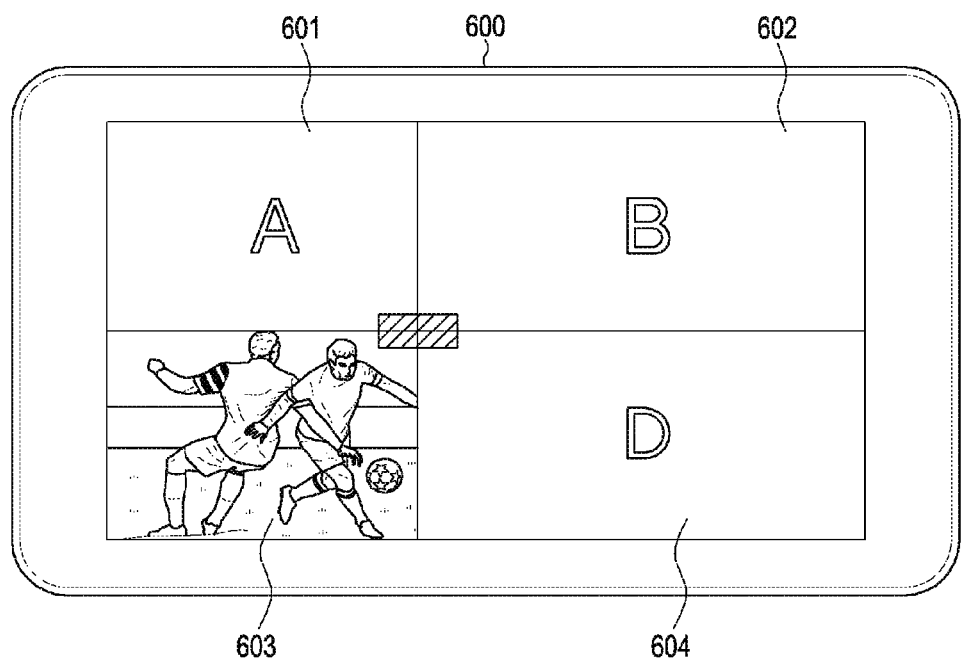
Figure 6C:
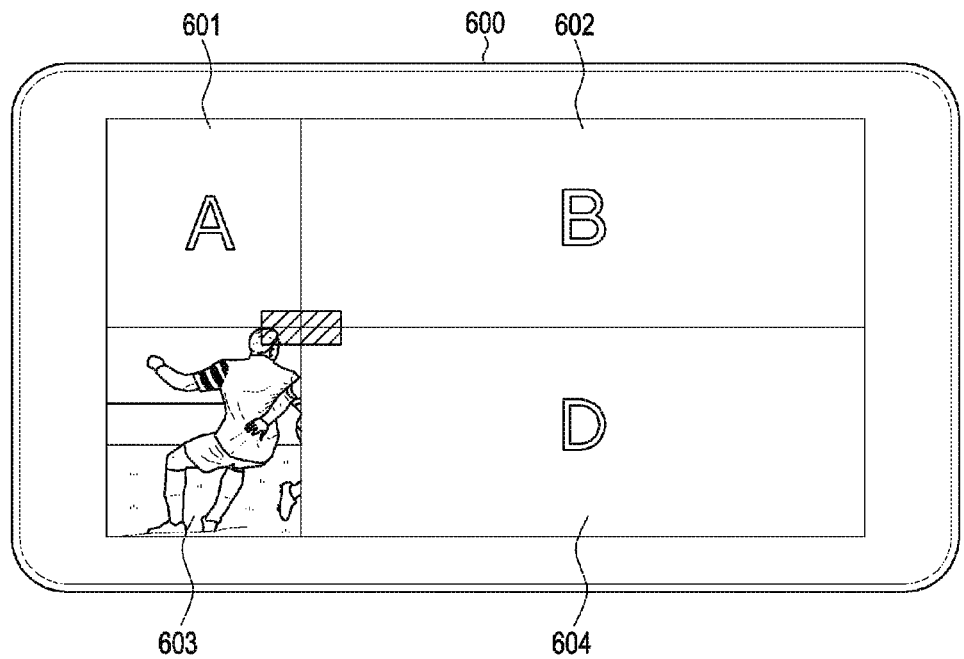

FIGS. 6A to 6C illustrate a case in which a screen is reduced according to an embodiment of the present disclosure.

Referring to FIG. 6A, a display device 600 displays first to fourth windows 601, 602, 603, and 604 on a touch screen. The third window 603 may execute a gallery application that displays a specific image file. Referring to FIGS. 6B and 6C, a user may reduce the third window 603 by dragging a center button.

A controller (not illustrated) reduces a horizontal size of the third window 603 based on the input window size change command, and displays the third window 603. Referring to FIG. 6B, the controller (not illustrated) may decrease a horizontal length of the third window 603 to display the third window 603. The controller (not illustrated) controls such that only a portion of an image is displayed as the size of the third window 603 is reduced. For example, the controller (not illustrated) controls such that a right side portion of the image is not displayed, thereby creating an effect that the right side portion of the image is hidden due to the size reduction of the third window 603. Meanwhile, when the size of the third window 603 is further reduced as illustrated in FIG. 6C, the display device 600 displays only a portion of the image in correspondence to the size reduction. More specifically, the controller (not illustrated) may control the display device 600 to display only a portion of the image such that the image is hidden by a boundary line.

Figure 6D:
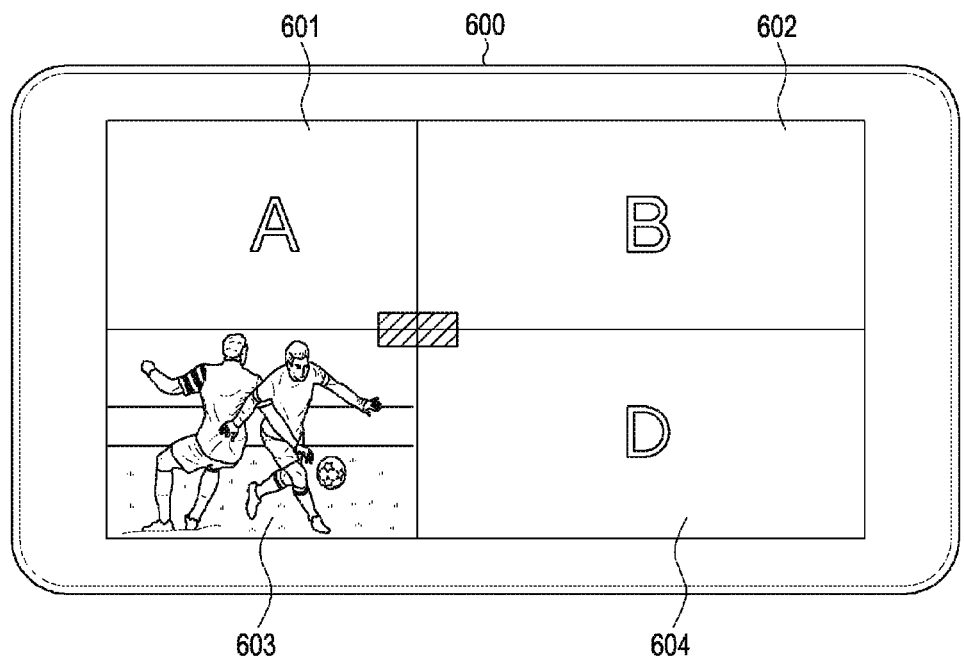

FIG. 6D illustrates a process of changing a window size according to another embodiment of the present disclosure.

Referring to FIG. 6D, the controller (not illustrated) may change a horizontal to vertical ratio of an image to display the image in the entire reduced third window 603.

Figure 6E:
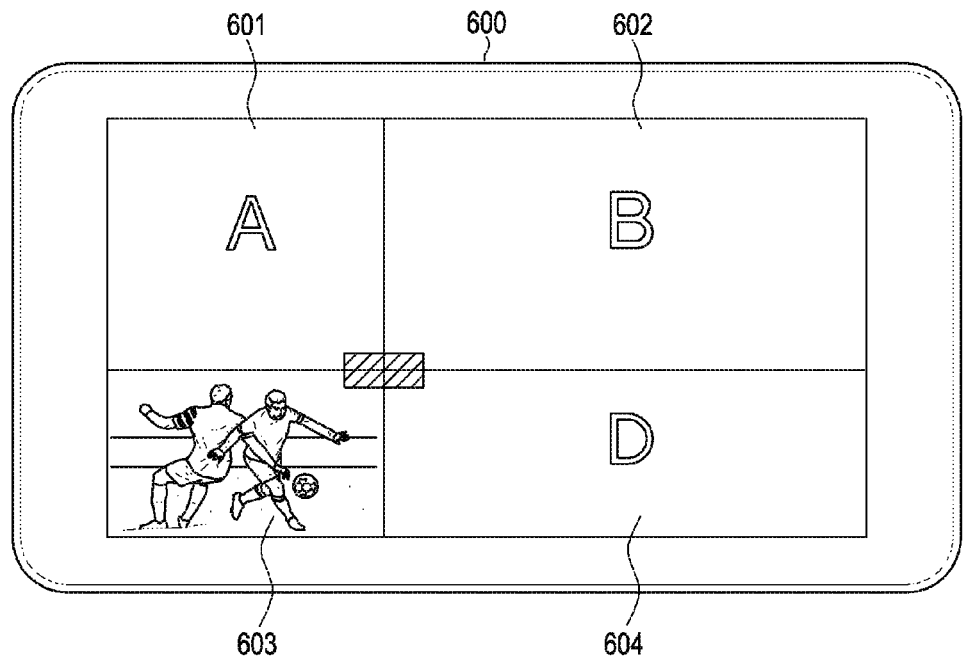
Figure 6F:
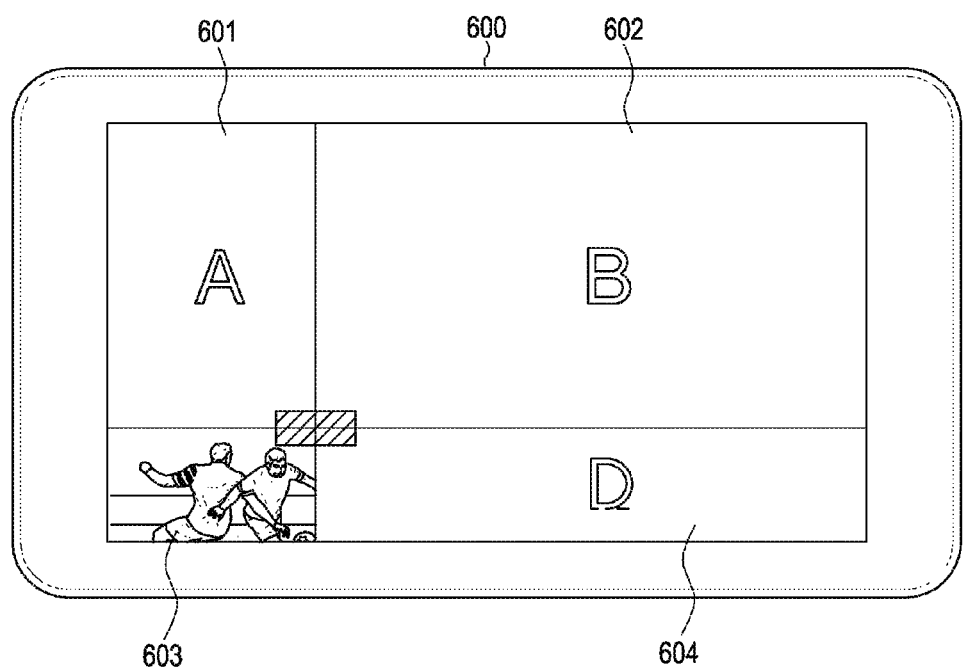

FIGS. 6E and 6F illustrate a process of changing a window size according to another embodiment of the present disclosure.

Referring to FIG. 6E, a controller (not illustrated) reduces horizontal and vertical sizes of a third window 603 based on the input window size change command, and displays the third window 603. The controller (not illustrated) may decrease horizontal and vertical lengths of the third window 603 to display the third window 603, as illustrated in FIG. 6E. As the size of the third window 603 is reduced, the controller (not illustrated) may also reduce and display an image at the same rate as the third window 603. That is, the reduced image may have the same scale as the image prior to the reduction. However, when an image is reduced in size smaller than a preset threshold value, a user may have difficulty in recognizing the image. Accordingly, when the window is reduced in size smaller than the threshold value, referring to FIG. 6F, the controller (not illustrated) may display only a portion of the image. More specifically, the controller (not illustrated) may display only a portion of the image such that the image is hidden by a boundary line.

FIGS. 6G to 6K illustrate a process of moving a screen according to various embodiments of the present disclosure.

Figure 6G:
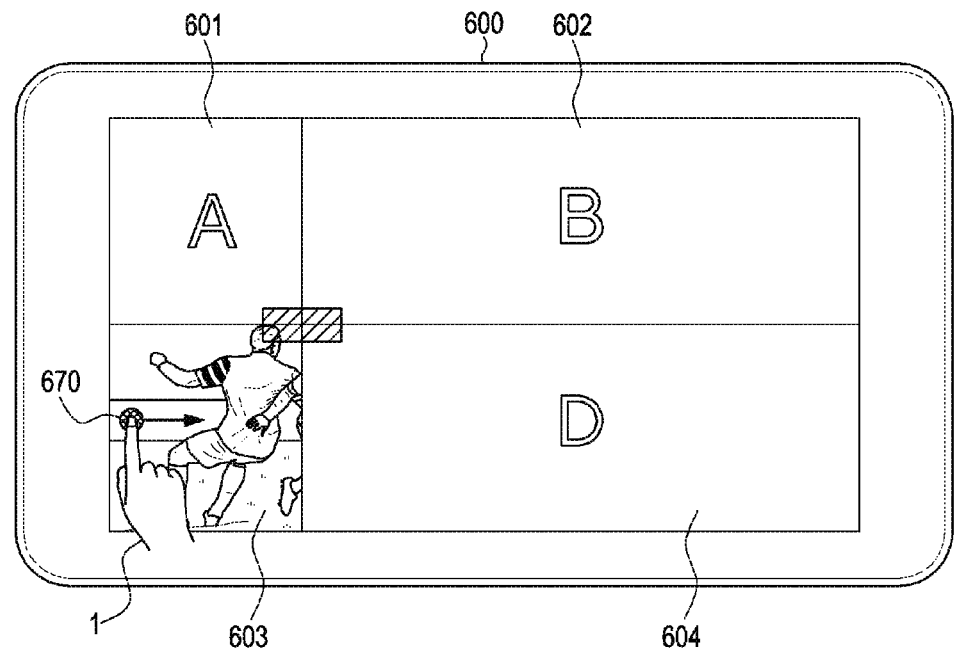
FIGS. 6G, 6H, 6I, 6J, 6K, 6L, 6M, and 6N illustrate a process of moving a screen according to various embodiments of the present disclosure.
Figure 6H:
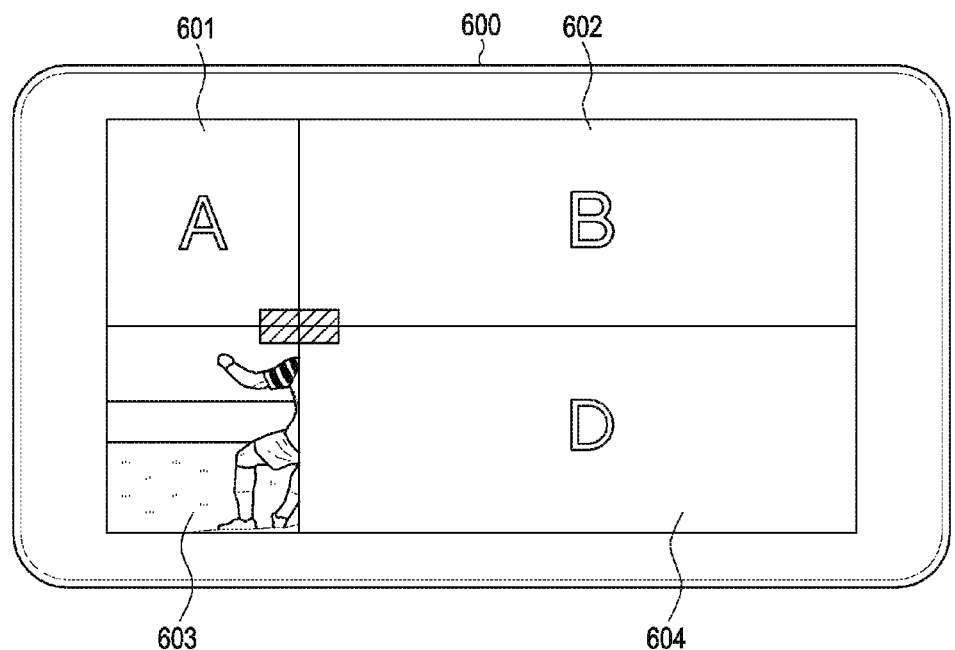
Figure 6I:
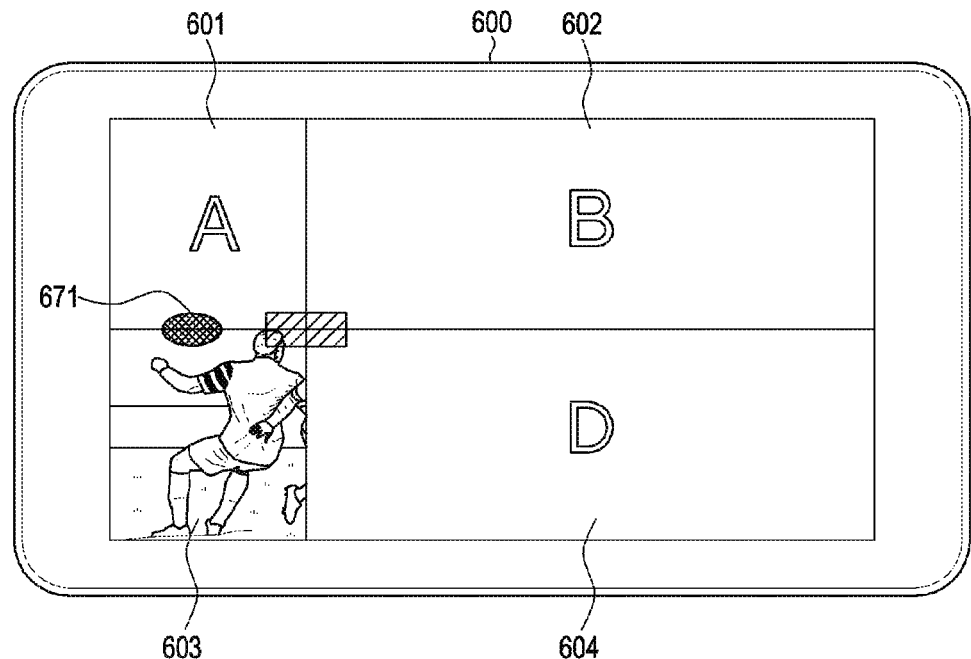
Figure 6J:
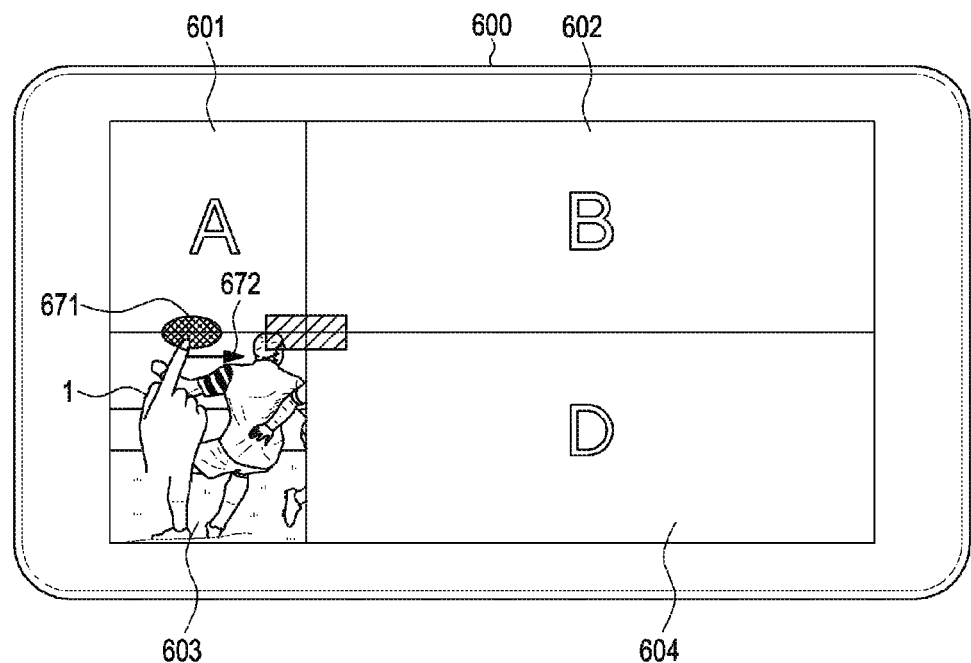
Figure 6K:
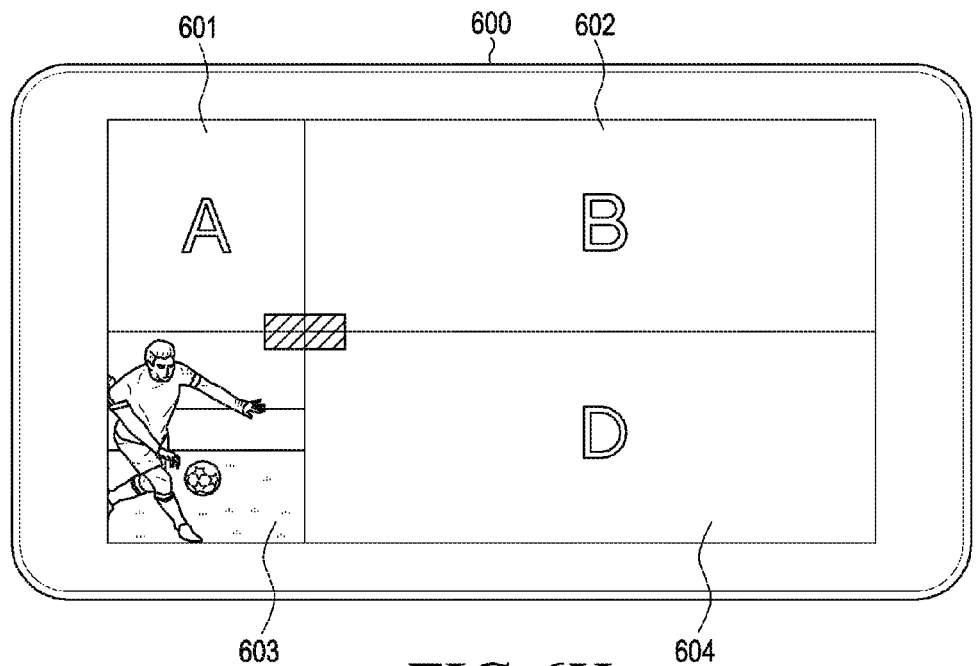

Referring to FIG. 6G, a user 1 may input a screen movement command on the third window 603. The screen movement command may be a rightward drag 670. However, the rightward drag is merely illustrative. When the screen movement command is input, a controller (not illustrated) may move and display the screen displayed on the third window 603 in response to the screen movement command. Referring to FIG. 6H, the controller (not illustrated) may display a screen moved leftwards on the third window 603. Alternatively, as another embodiment, referring to FIG. 6I, the controller (not illustrated) may generate and display a scroll bar 671. The scroll bar 671 may be moved by a user, and a screen may be moved and displayed in correspondence to a movement of the scroll bar 671. For example, referring to FIG. 6J, a user 1 may input a screen movement command that is a rightward drag 672 on the scroll bar 671. Referring to FIG. 6K, the controller (not illustrated) may display the screen moved rightward on the third window 603 in response to the input screen movement command. In addition, when a preset time interval passes after the screen is moved, the controller (not illustrated) may not display the scroll bar 671. Meanwhile, the scroll bar 671 displayed at an upper side of the third window and moved leftward and rightward is merely illustrative, and the scroll bar 671 may also be displayed at a left side or right side of the third window, and may be moved upward and downward.

Figure 6L:
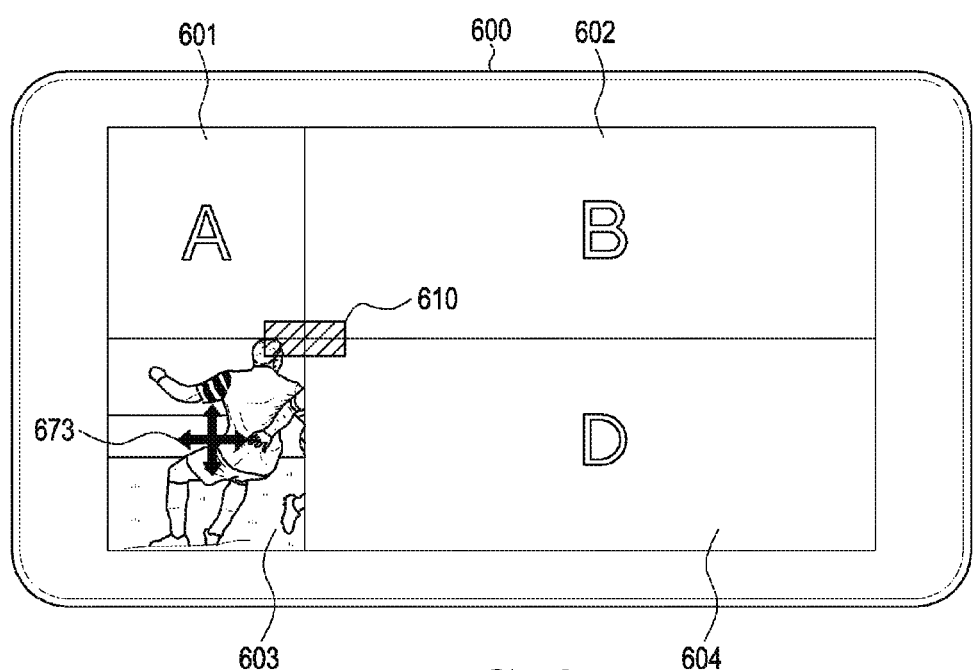
Figure 6M:
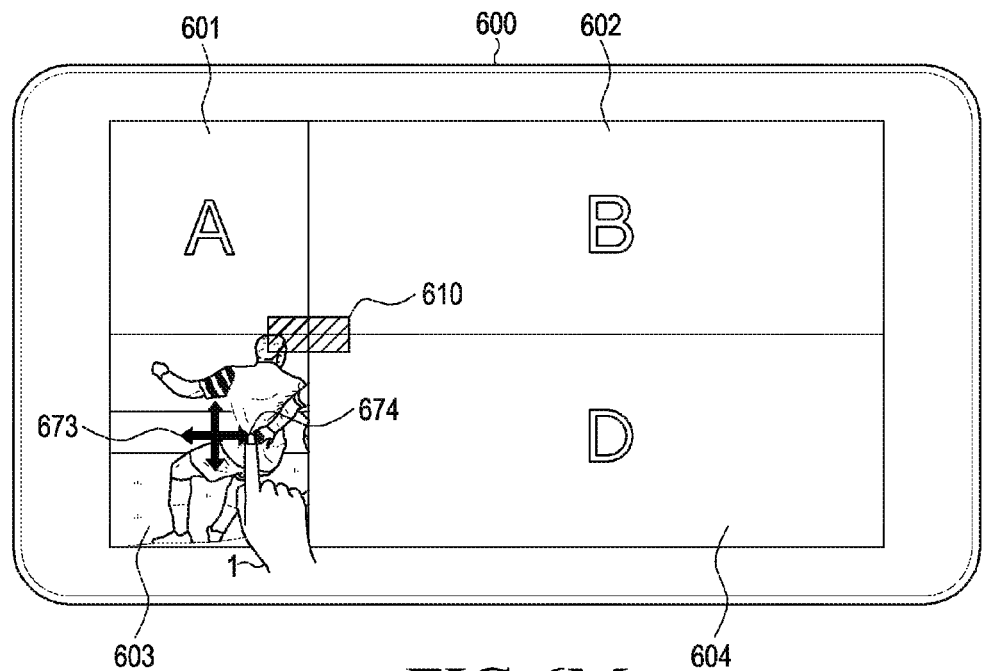
Figure 6N:
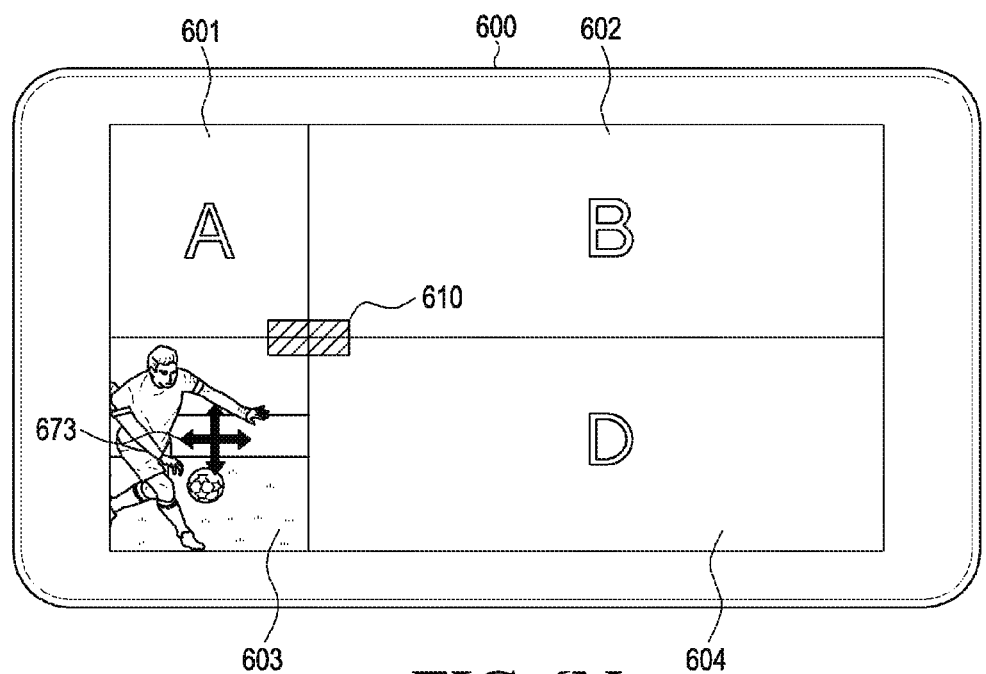

As another embodiment of the present disclosure, referring to FIG. 6L, the controller may generate and display a directional navigator 673. A screen may be moved and displayed in a direction input by a user through the directional navigator 673. For example, referring to FIG. 6M, a user 1 may input a screen movement command that is a rightward touch 674 on the directional navigator 673. Referring to FIG. 6N, the controller (not illustrated) may display a screen moved rightward on a third window 603 in response to the input screen movement command. In addition, when a preset time interval passes after the screen is moved, the controller (not illustrated) may not display the directional navigator 673. Meanwhile, the directional navigator 673 displayed at a center of the third window is merely illustrative, and the directional navigator 673 may also be displayed at a left, right, upper, or lower side of the third window.

Figure 7A:
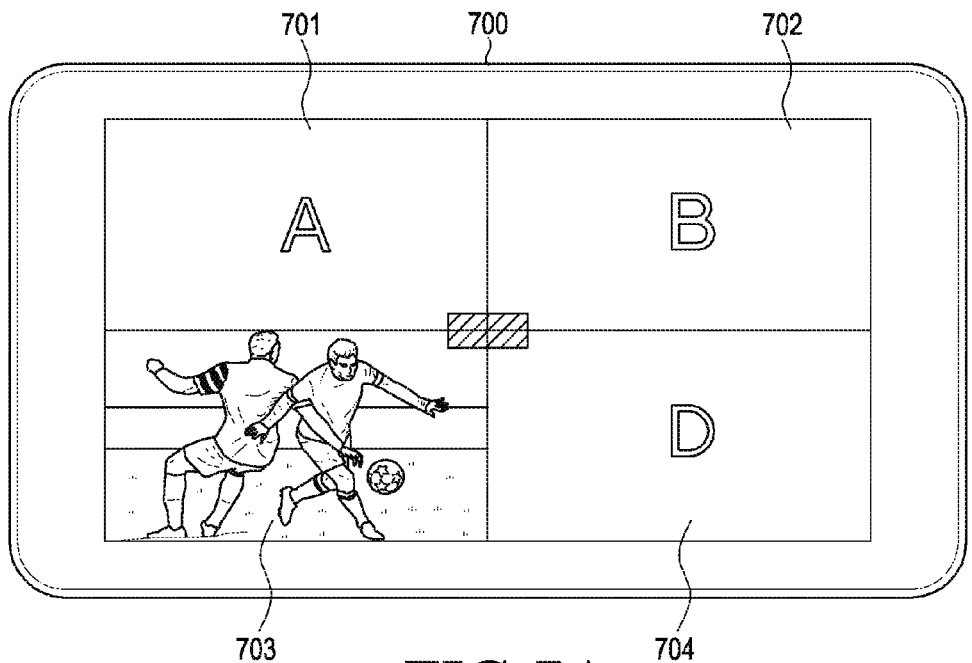
FIGS. 7A, 7B, 7C, 7D, and 7E illustrate cases in which a screen is reduced according to various embodiments of the present disclosure.
Figure 7B:
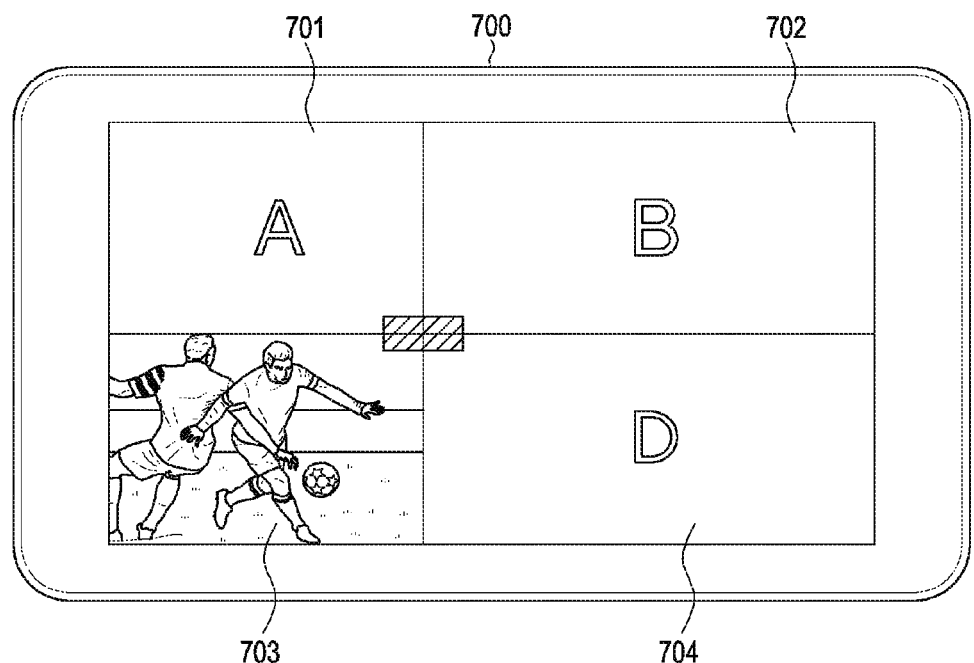
Figure 7C:
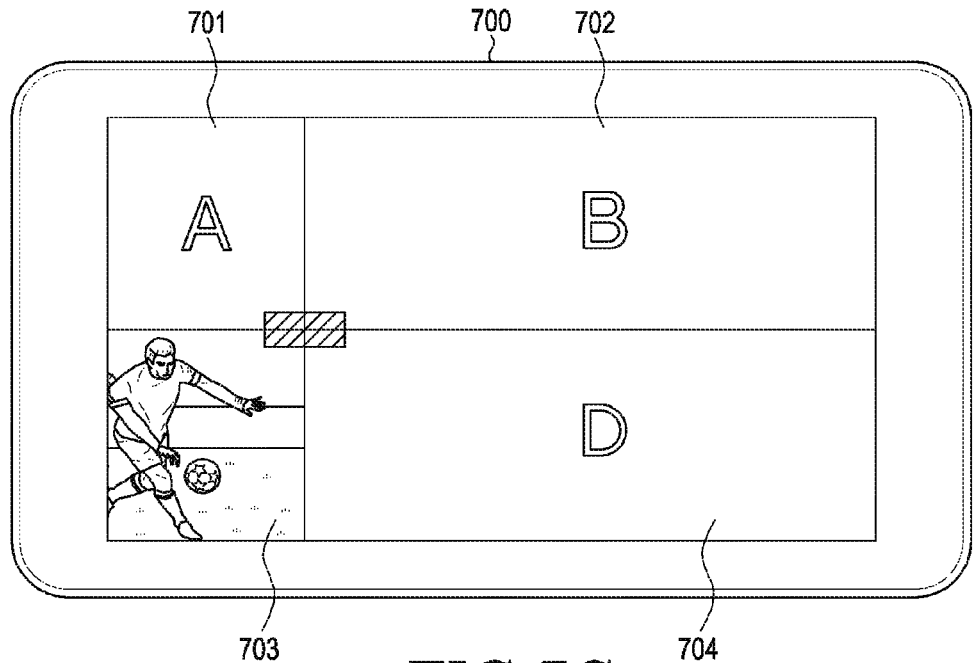

FIGS. 7A to 7C illustrate a case in which a screen is reduced according to another embodiment of the present disclosure.

Referring to FIG. 7A, a display device 700 displays first to fourth windows 701, 702, 703, and 704 on a touch screen. The third window 703 may execute a gallery application that displays a specific image file. Referring to FIGS. 7B and 7C, a user may reduce the third window 703 by dragging a center button.

A controller (not illustrated) decreases a horizontal length of the third window 703 based on the input window size change command, and displays the third window 703. Referring to FIG. 7B, the controller (not illustrated) may decrease the horizontal length of the third window 703 to display the third window 703. The controller (not illustrated) controls such that only a portion of an image is displayed as the size of the third window 703 is reduced. For example, the controller (not illustrated) controls such that a left side portion of the image is not displayed, thereby creating an effect that the image is pushed leftward due to the size reduction of the third window 703. Meanwhile, when the size of the third window 703 is further reduced as illustrated in FIG. 7C, the display device 700 displays only a portion of the image in correspondence to the size reduction. More specifically, the controller (not illustrated) may control such that the image is displayed as if pushed out by a boundary line.

Figure 7D:
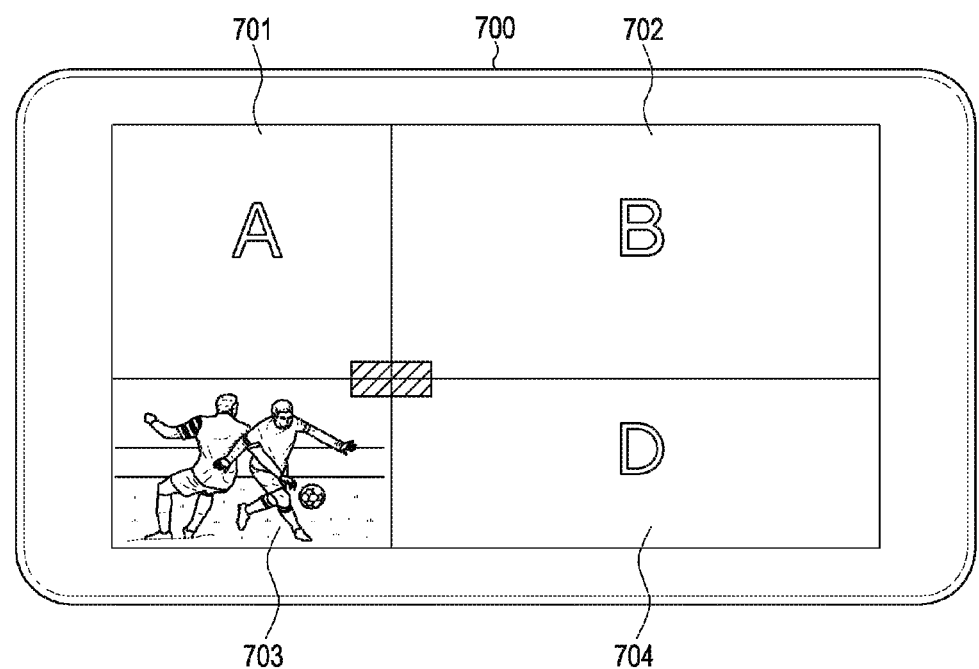
Figure 7E:
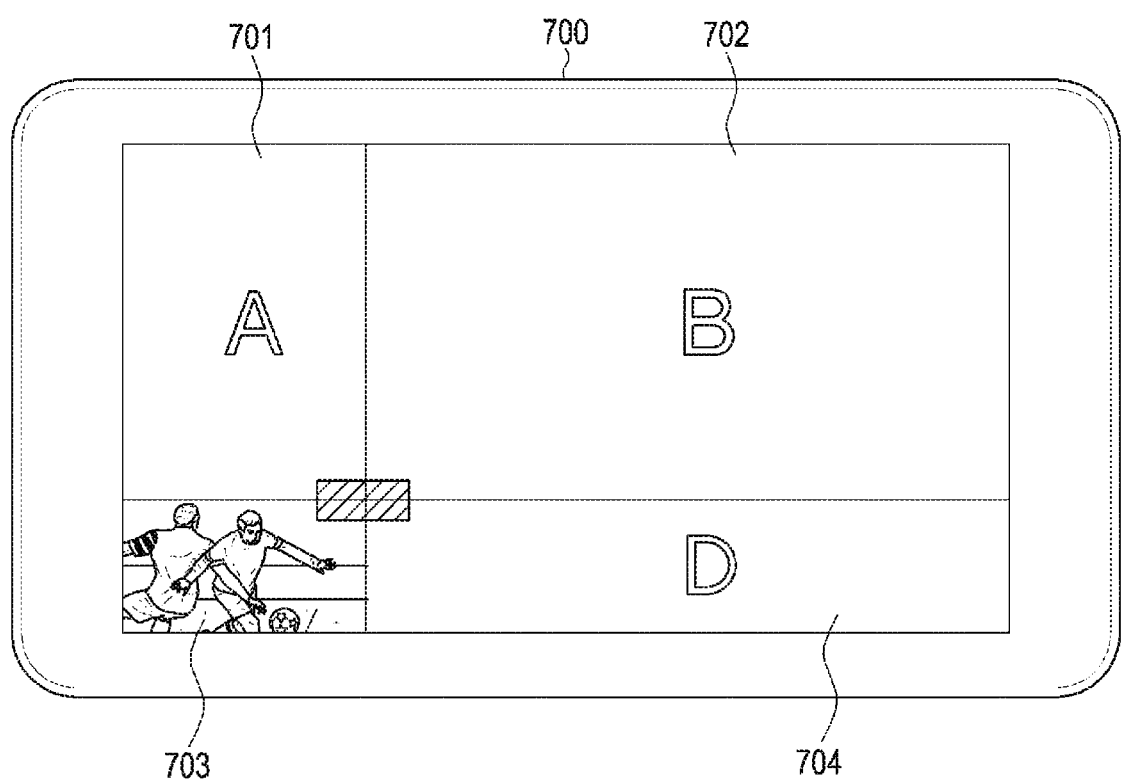

FIGS. 7D and 7E illustrate a process of changing a window size according to another embodiment of the present disclosure.

Referring to FIG. 7D, a controller (not illustrated) reduces horizontal and vertical sizes of a third window 703 based on the input window size change command, and displays the third window 703. The controller (not illustrated) may decrease horizontal and vertical lengths of the third window 703 to display the third window 703, as illustrated in FIG. 7D. As the size of the third window 703 is reduced, the controller (not illustrated) may also reduce and display an image at the same rate as the third window 703. That is, the reduced image may have the same scale as the image prior to the reduction. However, when an image is reduced in size smaller than a preset threshold value, a user may have difficulty in recognizing the image. Accordingly, when the window is reduced in size smaller than the threshold value, referring to FIG. 7E, the controller (not illustrated) may display only a portion of the image. More specifically, the controller (not illustrated) may control such that the image is displayed as if pushed out by a boundary line.

Figure 7F:
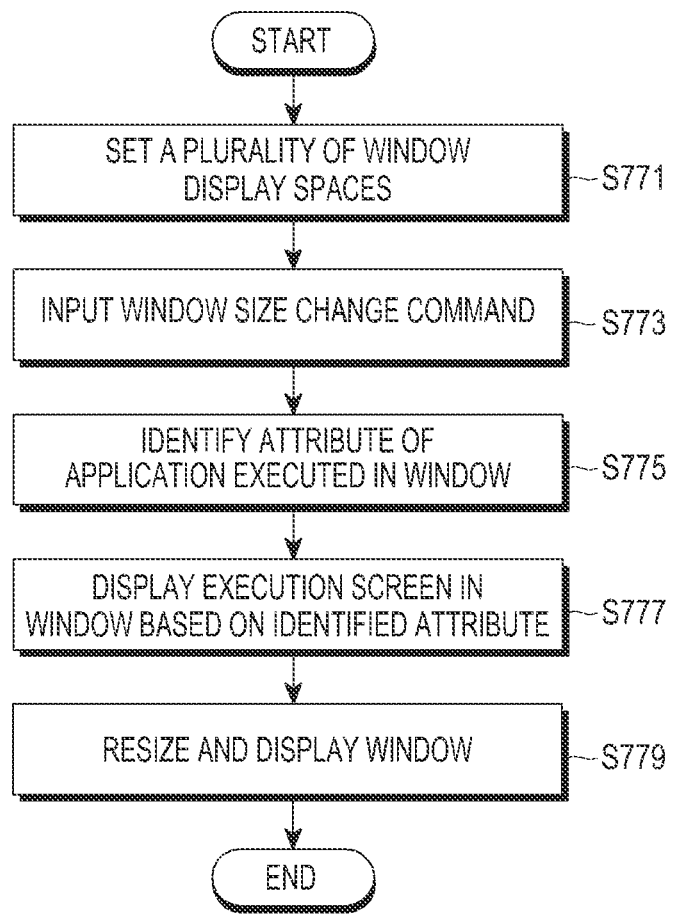
FIG. 7F is a flowchart illustrating a method of controlling a display device according to an embodiment of the present disclosure.

FIG. 7F is a flowchart illustrating a method of controlling a display device according to an embodiment of the present disclosure.

The display device may set a plurality of window display spaces such as, for example, first to fourth areas of FIG. 2A to display a plurality of windows, in operation S771. The display device may set, for example, at least one boundary line, and thereby may set the plurality of window display spaces.

When the plurality of window display spaces are set, the display device may receive an input of a window size change command such as a gesture to drag a boundary line or a center button, in operation S773.

The display device grasps the windows to be changed in size, based on the input window size change command. The display device may identify an attribute of an application executed in the windows to be changed in size, in operation S775. More specifically, the display device may identify a size change attribute of an execution screen of the application executed in the windows to be changed in size, and attributes of applications are illustrated in Table 2 below.

TABLE 2

| Application | Attribute |
| --- | --- |
| 1$^{st}$ Application | Size & Horizontal to Vertical Ratio are changeable. |
| 2$^{nd}$ Application | Size is changeable. Horizontal to Vertical Ratio is unchangeable. |
| 3$^{rd}$ Application | Size & Horizontal to Vertical Ratio are unchangeable: A portion of execution screen is hidden when window size is changed. |
| 4$^{th}$ Application | Size & Horizontal to Vertical Ratio are unchangeable: A portion of execution screen is pushed out when window size is changed. |

As illustrated above, the attribute of the application may relate to a change in at least one of a size and a horizontal to vertical ratio of the execution screen of the application. The display device may identify that an execution screen of the first application is changeable in size and horizontal to vertical ratio. The display device may identify that an execution screen of the second application is changeable in size and is unchangeable in horizontal to vertical ratio. The display device may identify that an execution screen of the third application is unchangeable in size and horizontal to vertical ratio. Meanwhile, when a window size is changed, the third application displays only a portion of the application execution screen, in which case the application execution screen may be displayed as illustrated in FIGS. 6A to 6C, while being hidden by a boundary line. The display device may identify that an execution screen of the fourth application is unchangeable in size and horizontal to vertical ratio. Meanwhile, when a window size is changed, the fourth application displays only a portion of the application execution screen, in which case the application execution screen may be displayed as if pushed out as illustrated in FIGS. 7A to 7C. At a time point when the respective applications are installed, the display device may identify meta data of the applications, and may identify and store an attribute included in the meta data.

The display device generates and displays an application execution screen in the corresponding window, based on the identified attribute of the applications, in operation S777, and resizes and displays the window based on a window size change command, in operation S779.

As described above, the display device may also diversely change and display the application execution screen according to the change in the window size.

Figure 7G:
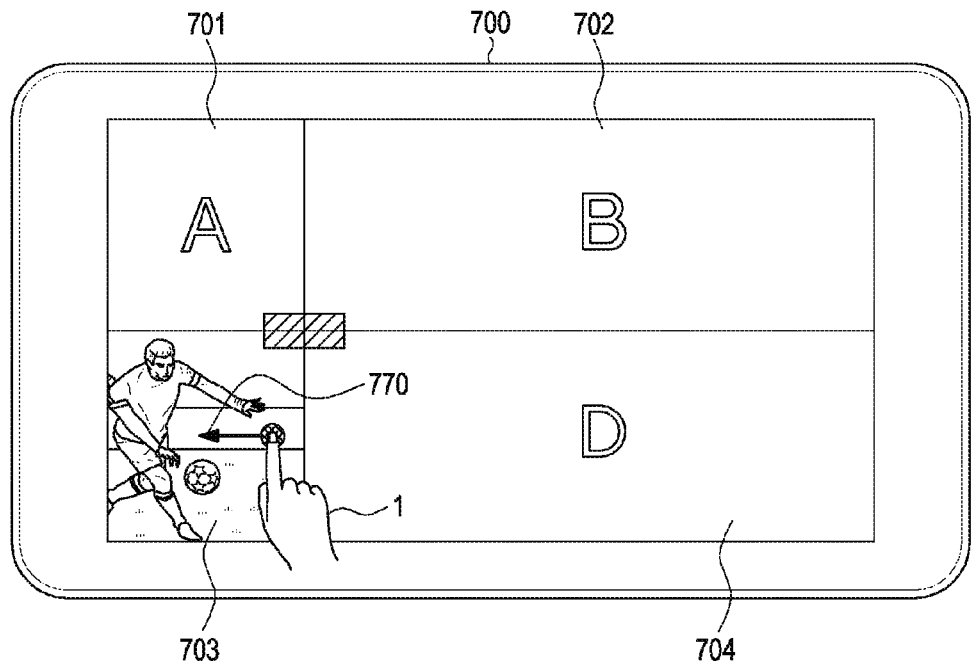
FIGS. 7G, 7H, 7I, 7J, and 7K illustrate a process of moving a screen according to various embodiments of the present disclosure.
Figure 7H:
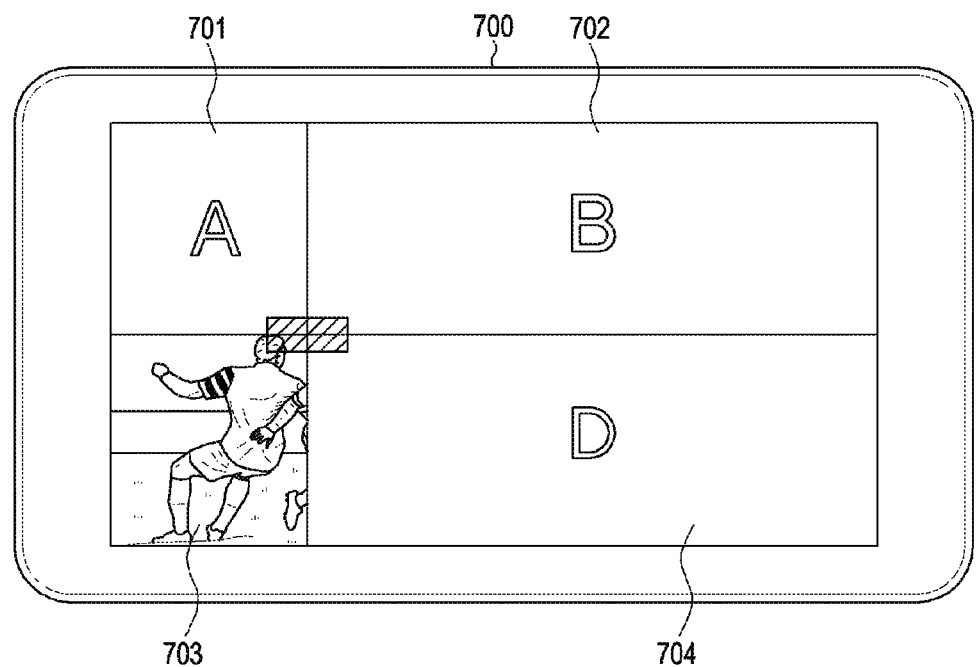

FIGS. 7G to 7K illustrate a process of moving a screen according to various embodiments of the present disclosure. Referring to FIG. 7G, a user 1 may input a screen movement command on a third window 703. The screen movement command may be a leftward drag 770. However, the leftward drag 770 is merely illustrative. When the screen movement command is input, a controller (not illustrated) may move and display the screen displayed on the third window 703 in response to the screen movement command. Referring to FIG. 7H, the controller (not illustrated) may display a screen moved leftwards on the third window 703.

Figure 7I:
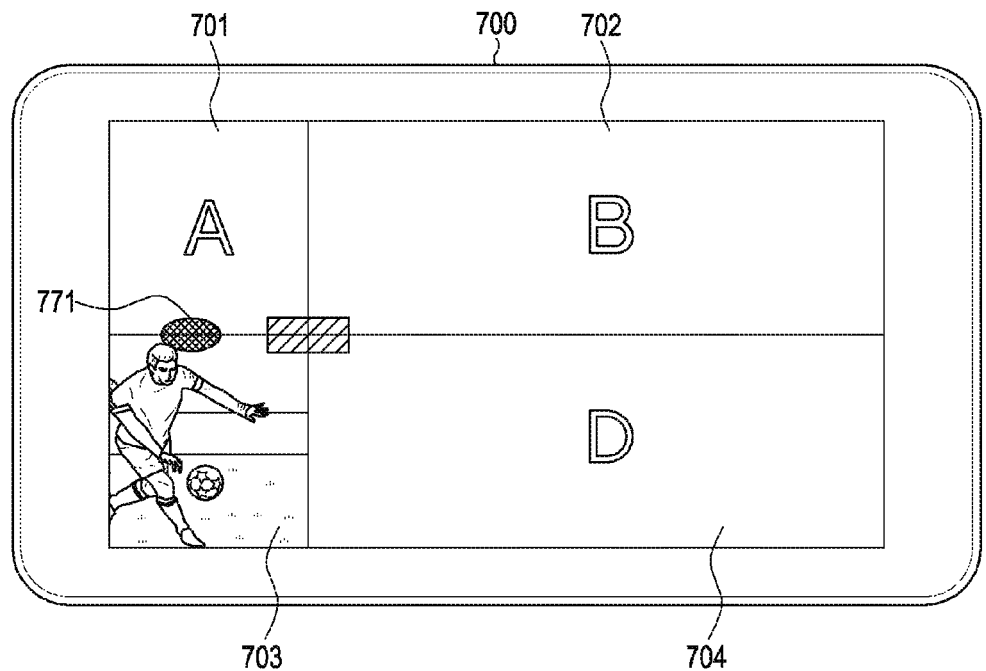
Figure 7J:
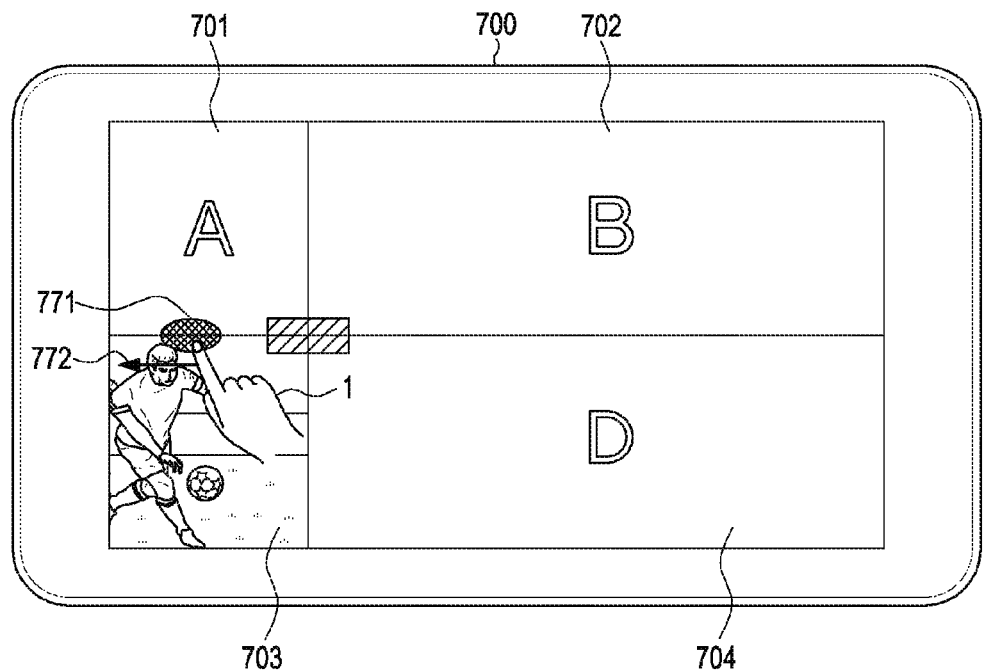
Figure 7K:
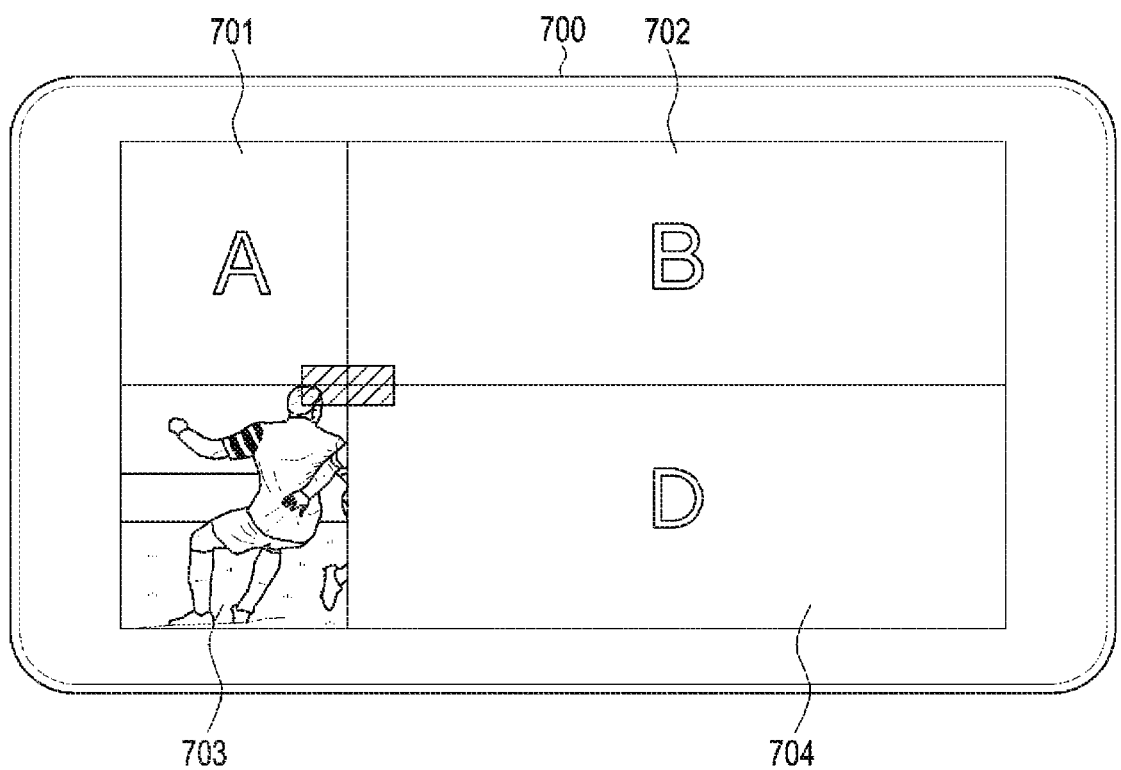

Alternatively, as another embodiment, referring to FIG. 7I, the controller (not illustrated) may generate and display a scroll bar 771. The scroll bar 771 may be moved by a user, and a screen may be moved and displayed in correspondence to a movement of the scroll bar 771. For example, referring to FIG. 7J, a user 1 may input a screen movement command that is a leftward drag 772 on the scroll bar 771. Referring to FIG. 7K, the controller (not illustrated) may display the screen 780 moved leftward on the third window in response to the input screen movement command. In addition, when a preset time interval passes after the screen is moved, the controller (not illustrated) may not display the scroll bar 771. Meanwhile, the scroll bar 771 displayed at an upper side of the third window and moved leftward and rightward is merely illustrative, and the scroll bar 771 may also be displayed at a left side or right side of the third window, and may be moved upward and downward.

Figure 8A:
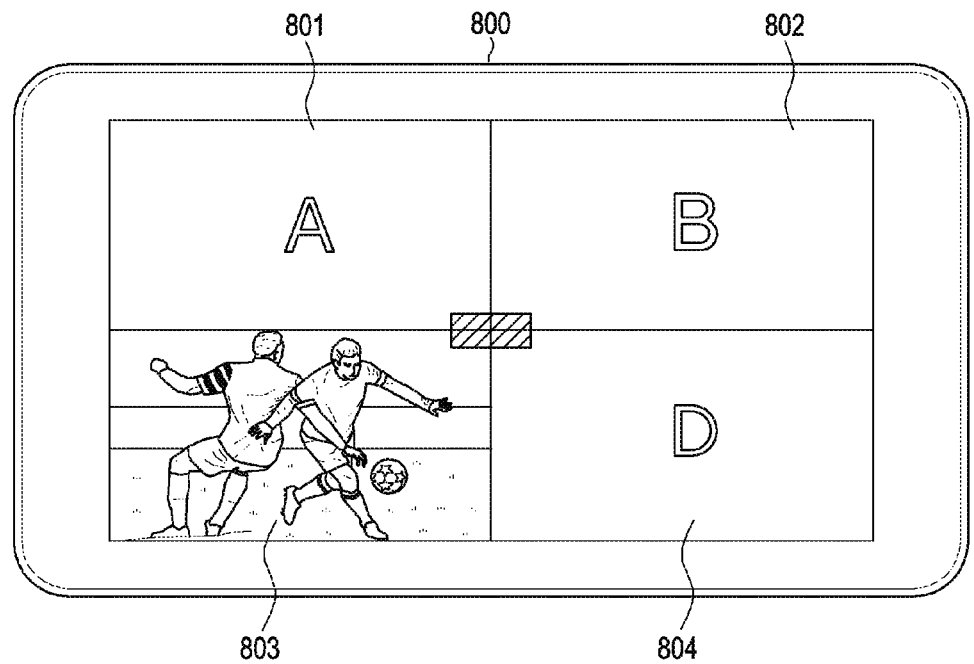
FIGS. 8A, 8B, and 8C illustrate a process of changing a window size.
Figure 8B:
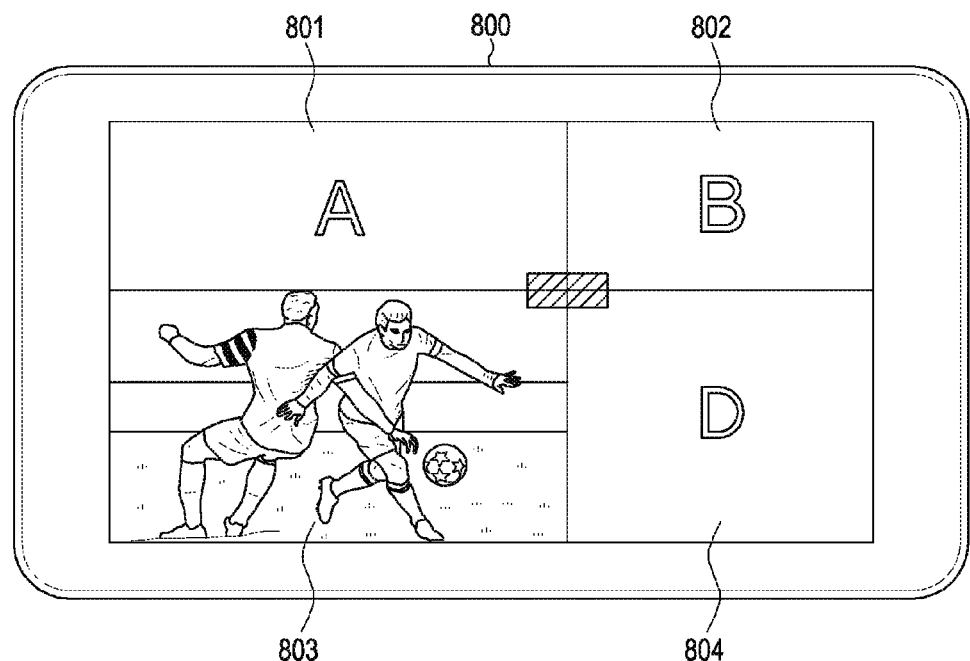
Figure 8C:
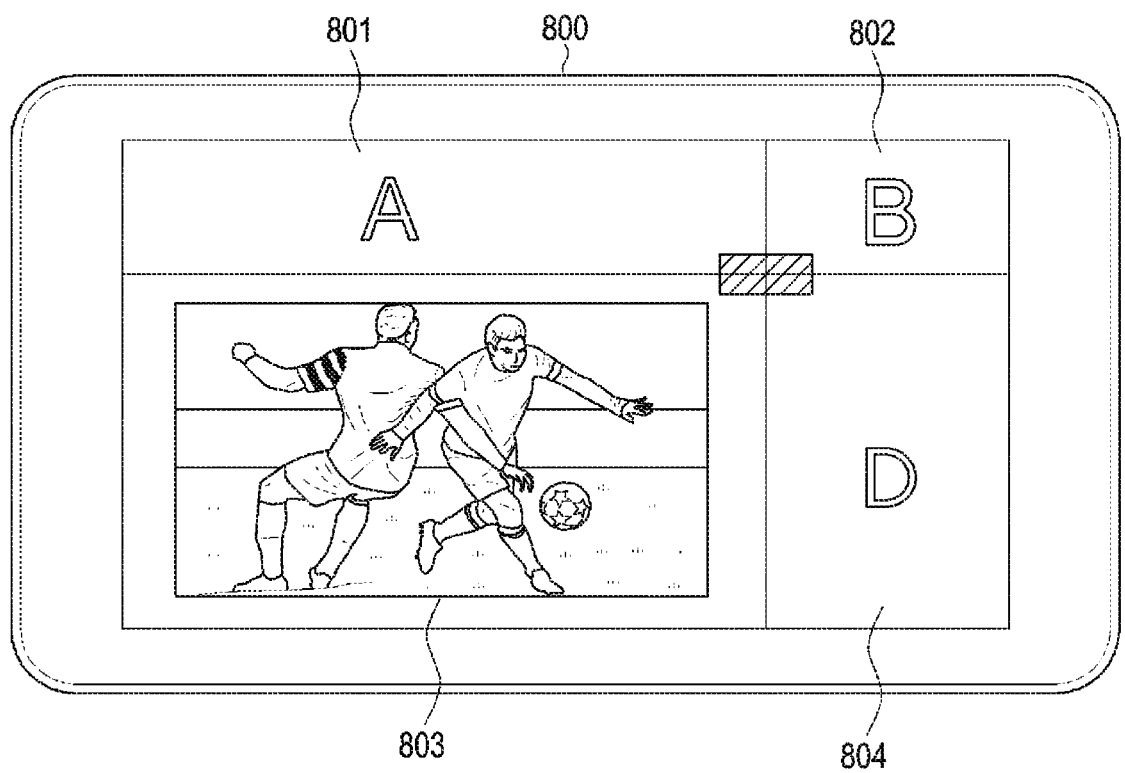

FIGS. 8A to 8C illustrate a process of changing a window size.

Referring to FIG. 8A, a display device 800 displays first to fourth windows 801, 802, 803, and 804 on a touch screen. The third window 803 may execute a gallery application that displays a specific image file. Referring to FIGS. 8B and 8C, a user may enlarge the third window 803 by dragging a center button.

Referring to FIG. 8B, a controller (not illustrated) enlarges and displays an application execution screen such that the application execution screen may be displayed in an entire area of an enlarged third window 813.

Meanwhile, referring to FIG. 8C, if the application execution screen is enlarged in correspondence to a window size when the third window 803 is further enlarged, there may be a problem in resolution. Accordingly, the display device may enlarge and display only the third window 803 without further enlarging the application execution screen. Namely, the display device may compare the size of the application execution screen with a preset threshold value, and may control such that the application execution screen is not enlarged in excess of the threshold value.

Figure 9A:
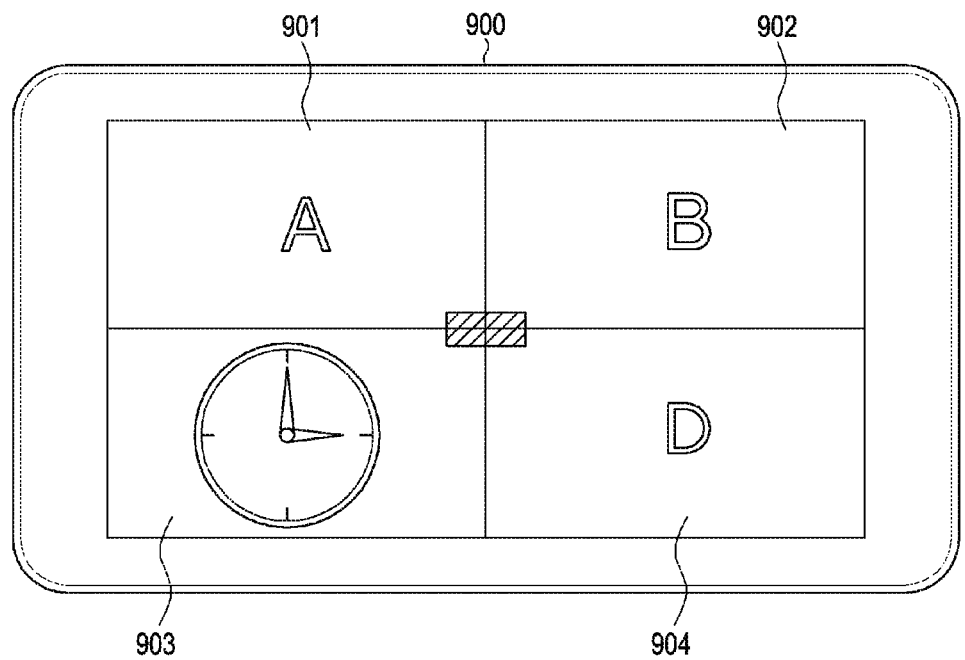
FIGS. 9A, 9B, and 9C illustrate a process of reducing a window size according to another embodiment of the present disclosure.
Figure 9B:
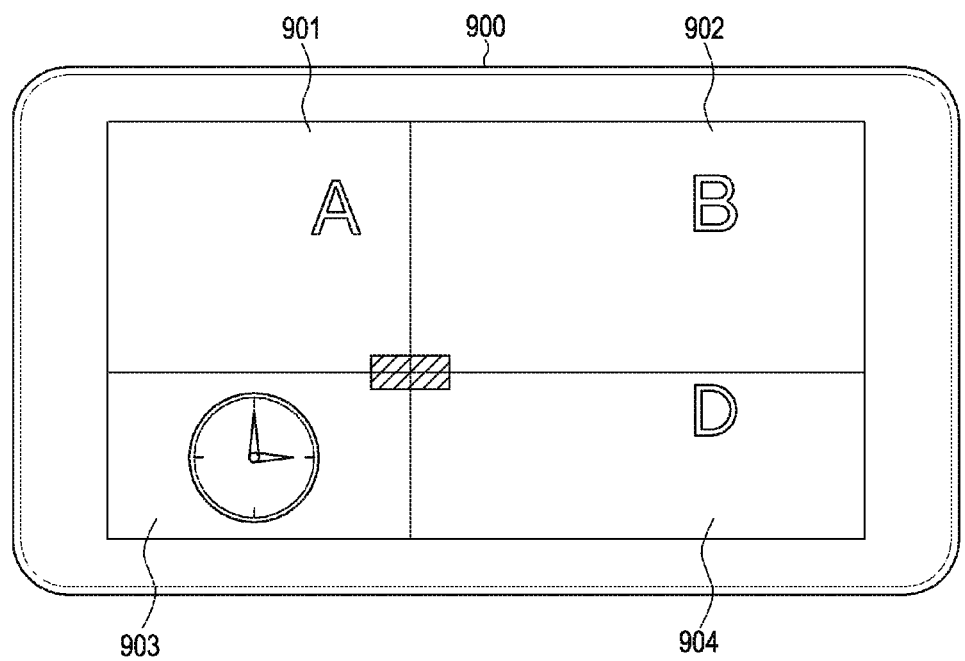
Figure 9C:
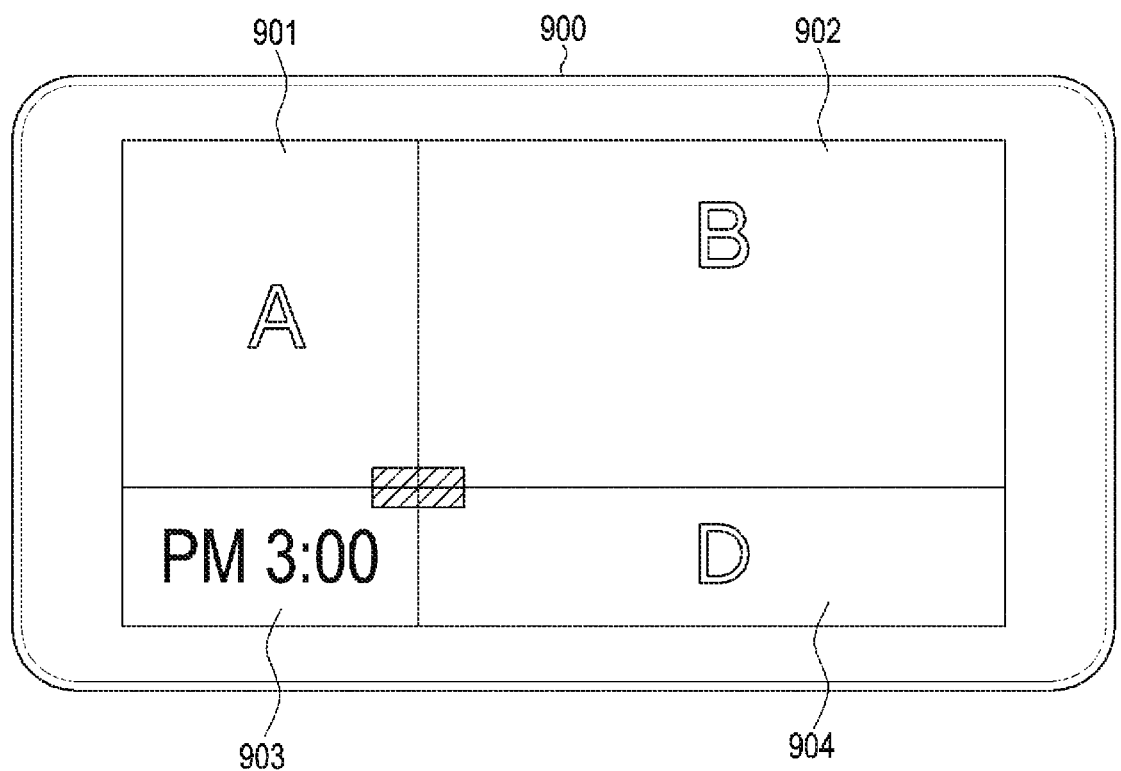

FIGS. 9A to 9C illustrate a process of reducing a window size according to another embodiment of the present disclosure.

Referring to FIG. 9A, a display device 900 displays first to fourth windows 901 to 904 on a touch screen. The third window 903 may execute a clock application that displays time. Referring to FIGS. 9B and 9C, a user may reduce the third window 903 by dragging a center button.

Referring to FIG. 9B, a controller (not illustrated) reduces and displays an application execution screen such that the application execution screen may be displayed in an entire area of a reduced third window 903.

However, when the third window 903 is reduced as illustrated in FIG. 9C, it is difficult for a user to recognize time through an analog clock. Accordingly, the controller (not illustrated) may display another application execution screen instead of the existing application execution screen, when the third window 903 is reduced in size smaller than a preset threshold value. It may be identified in the embodiment of FIG. 9C that the execution screen of the application executed on the third window 903 has been replaced from the analog clock to a digital clock.

Figure 10A:
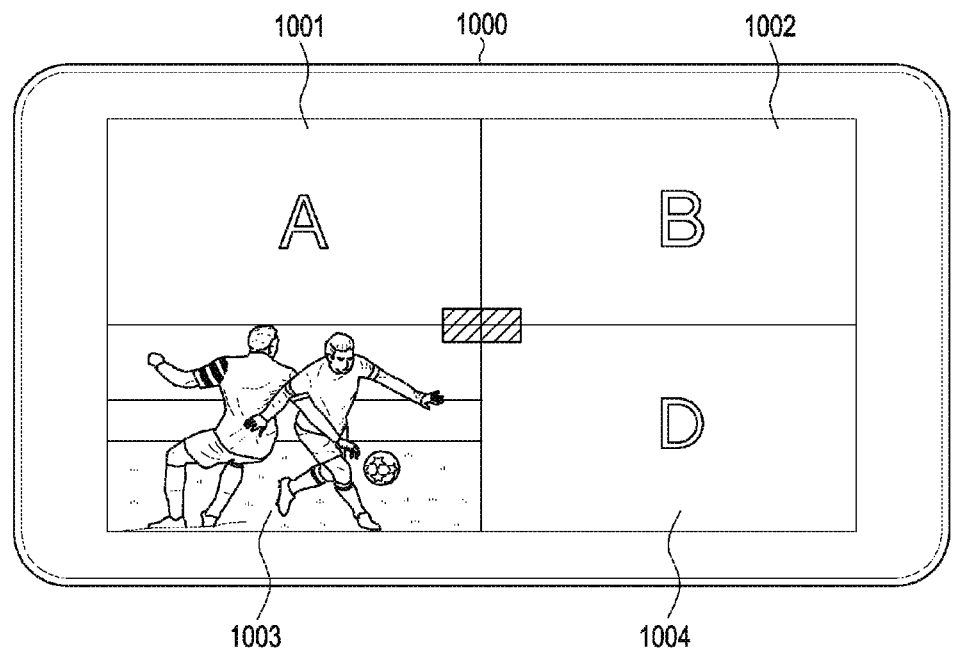
FIGS. 10A, 10B, and 10C illustrate a process of enlarging a window size according to another embodiment of the present disclosure.
Figure 10B:
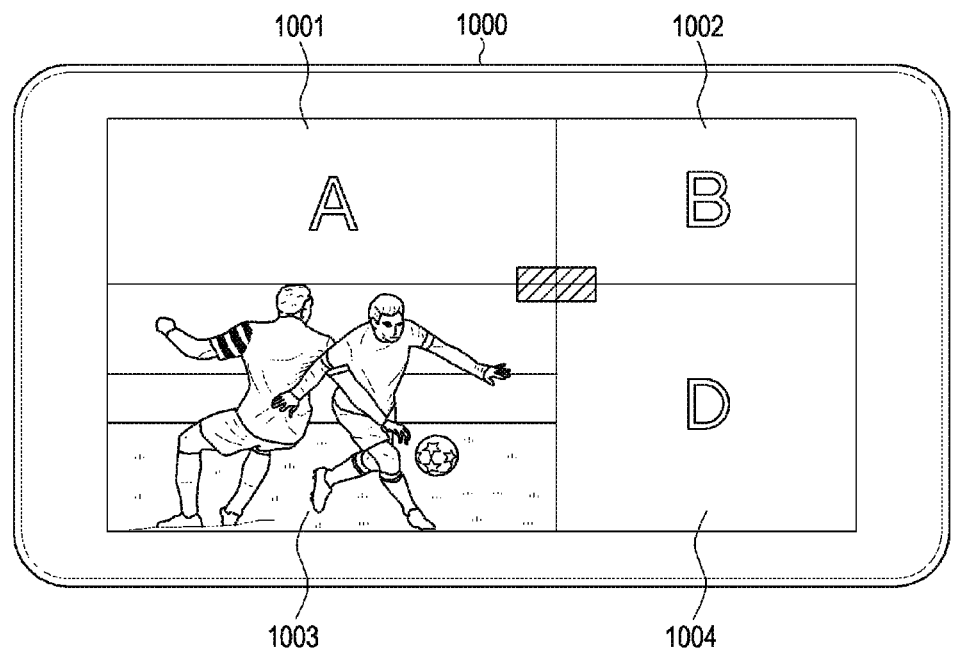
Figure 10C:
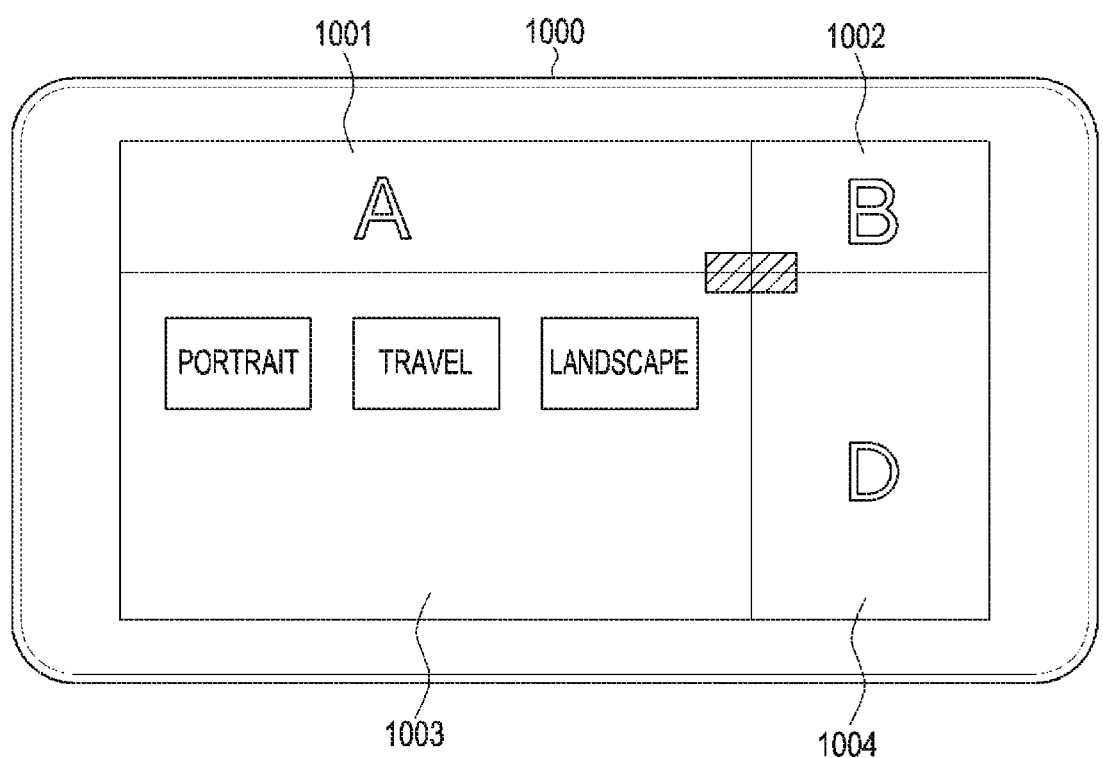

FIGS. 10A to 10C illustrate a process of enlarging a window size according to another embodiment of the present disclosure.

Referring to FIG. 10A, a display device 1000 displays first to fourth windows 1001, 1002, 1003, and 1004 on a touch screen. The third window 1003 may execute a gallery application that displays images. Referring to FIGS. 10B and 10C, a user may enlarge the third window 1003 by dragging a center button.

Referring to FIG. 10B, a controller (not illustrated) enlarges and displays an application execution screen such that the application execution screen may be displayed in an entire area of an enlarged third window 1003.

However, when the third window 1003 is enlarged as illustrated in FIG. 10C so that a size of the third window 1003 exceeds a preset threshold value, the display device may display another application execution screen instead of the existing execution screen. As noted, in the embodiment of FIG. 10C, an image screen of the gallery application has been replaced with a screen that displays folders into which applications are grouped.

Figure 11A:
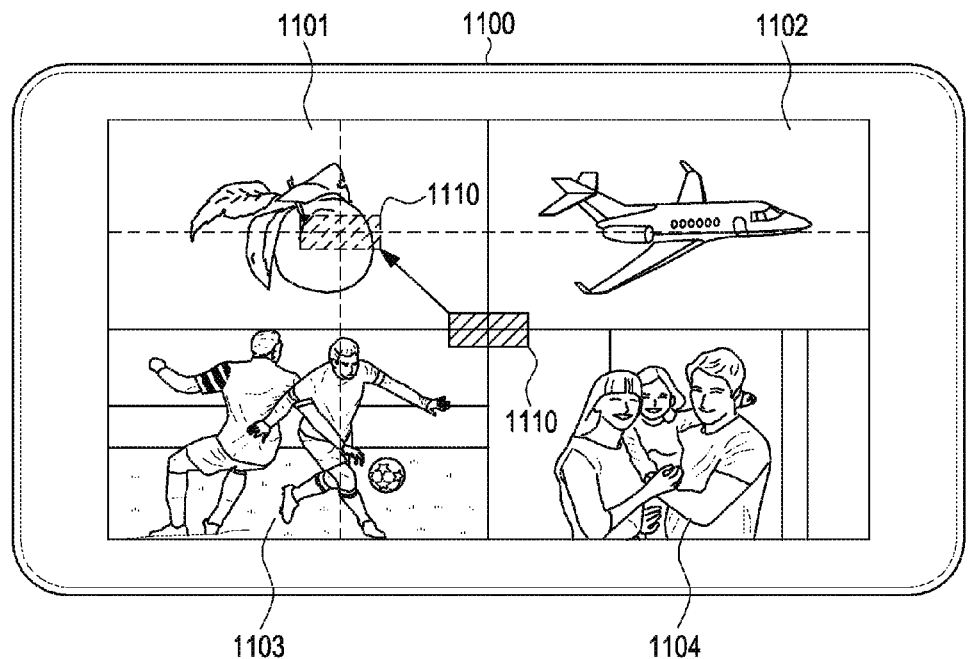
FIGS. 11A and 11B illustrate a process of displaying an application execution screen depending on a change in a window size according to an embodiment of the present disclosure.
Figure 11B:
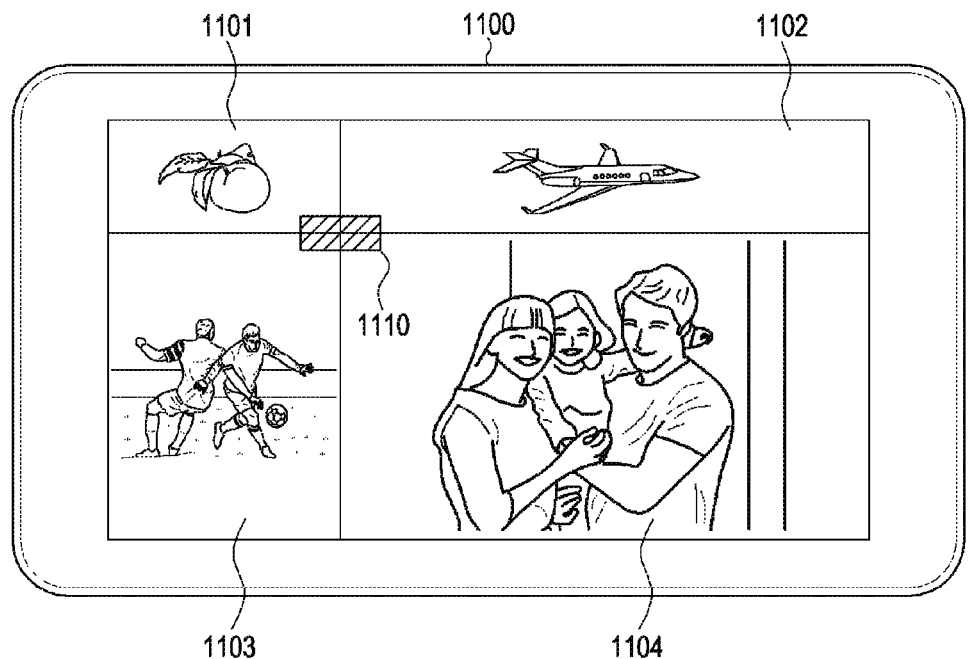

FIGS. 11A and 11B illustrate a process of displaying an application execution screen depending on a change in a window size according to an embodiment of the present disclosure.

Referring to FIG. 11A, a display device 1100 may display a plurality of windows 1101, 1102, 1103, and 1104 such as, for example, first to fourth areas. A user may input a command to change a size of the plurality of windows 1101, 1102, 1103, and 1104 through a drag gesture on a center button 1110 or a boundary line. Referring to FIG. 11B, depending on the change in the window size according to the embodiment of the present disclosure, application execution screens may be displayed in the respective windows 1101, 1102, 1103, and 1104 the size of which is changed through scaling by which a horizontal to vertical ratio prior to the change is maintained.

Figure 12:
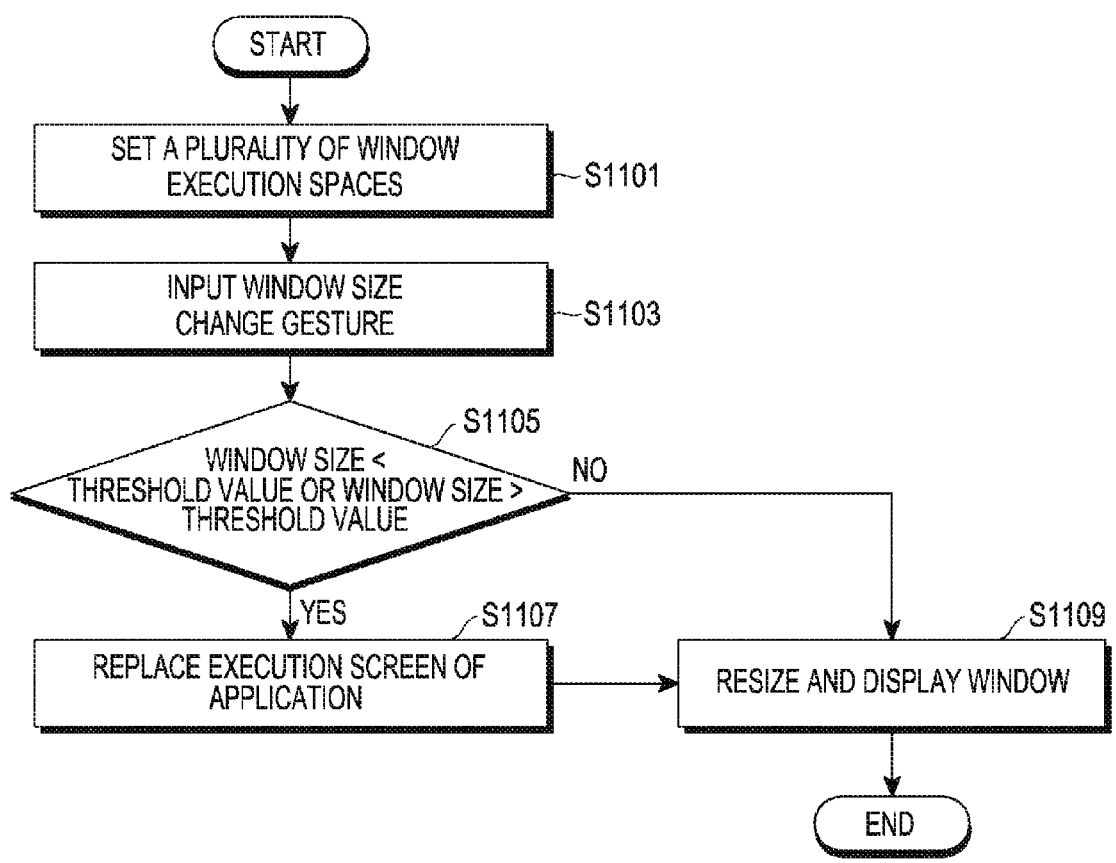
FIG. 12 is a flowchart describing a method of controlling a display device according to another embodiment of the present disclosure.

FIG. 12 is a flowchart describing a method of controlling a display device according to another embodiment of the present disclosure.

The display device may set a plurality of window display spaces such as, for example, the first to fourth areas of FIG. 2A to display a plurality of windows, in operation S1101. The display device may set, for example, at least one boundary line, and thereby may set the plurality of window display spaces.

When the plurality of window display spaces are set, the display device may receive an input of a window size change command such as a drag gesture on a boundary line or a center button, in operation S1103.

The display device may determine in operation S1105 whether a window size is smaller or larger than a threshold value. When the window size is not smaller or larger than the threshold value (S1105-N), the display device resizes and displays the window, and at the same time, resizes and displays the application execution screen in correspondence to the window size, in operation S1109. When the window size is smaller or larger than the threshold value (S1105-Y), the display device may display another screen instead of the application execution screen, in operation Si 107, and then proceeds to operation S1109.

It may be appreciated that the embodiments of the present disclosure can be implemented in software, hardware, or a combination thereof. Any such software may be stored, for example, in a volatile or non-volatile storage device such as a ROM, a memory such as a RAM, a memory chip, a memory device, or a memory Integrated Circuit (IC), or a recordable optical or magnetic medium such as a Compact Disk (CD), a Digital Versatile Disc (DVD), a magnetic disk, or a magnetic tape, regardless of its ability to be erased or its ability to be re-recorded. Also, it will be appreciated that the various embodiments of the present disclosure may be implemented by a computer or a portable terminal which includes a control unit and a memory, in which the memory may be an example of a non-transitory storage medium that is readable by a machine that is suitable for storing one or more programs that include instructions for implementing the various embodiments of the present disclosure. Accordingly, the present disclosure includes a program for a code implementing the apparatus and method described in the appended claims of the specification and a non-transitory machine (a computer or the like)-readable storage medium for storing the program. Moreover, such a program as described above can be electronically transferred through an arbitrary medium such as a communication signal transferred through cable or wireless connection, and the present disclosure properly includes the things equivalent to that.

Further, the device can receive the program from a program providing apparatus connected to the device wirelessly or through a wire and store the received program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of controlling a display device comprising a touch screen, the method comprising:
displaying, by a processor, on the touch screen, execution screens of a plurality of applications in a plurality of windows respectively, such that the plurality of windows do not overlap each other;
displaying, by the processor, a plurality of boundary lines differentiating the plurality of windows, wherein a first execution screen is displayed in a first window of the plurality of windows;
receiving, through the touch screen, an input of a window size change command to change a size of at least one of the plurality of windows;
resizing and displaying, by the processor, the at least one of the plurality of windows in correspondence to the window size change command such that the execution screens of the plurality of applications do not overlap each other; and
based on a size of the first window being less than a threshold according to the resizing, displaying a second execution screen other than the first execution screen in the first window in replacement of the first execution screen,
wherein the first and second execution screens are execution screens of a first application, and
wherein the second execution screen providing an alternate information of the first execution screen.

2. The method as claimed in claim 1, wherein the window size change command comprises a drag gesture starting from one of the plurality of boundary lines and ending at a first point.

3. The method as claimed in claim 2, wherein the resizing and displaying of the at least one of the plurality of windows comprises moving, to the first point, a boundary line to which the drag gesture is input and displaying the boundary line.

4. The method as claimed in claim 2, wherein the displaying of the plurality of boundary lines comprises generating views having a predetermined width while the plurality of boundary lines serves as a center line, and the receiving of the input of the window size change command comprises receiving an input of the drag gesture through the views.

5. The method as claimed in claim 1, wherein the resizing and displaying of the at least one of the plurality of windows comprises:
identifying an attribute of an application executed in a window to be changed in size; and
displaying an application execution screen of the window to be changed in size based on the attribute of the application.

6. The method as claimed in claim 5, wherein the attribute of the application comprises at least one of whether a size of an execution screen of the application is changed or whether a horizontal to vertical ratio is changed.

7. The method as claimed in claim 1, wherein the resizing and displaying of the at least one of the plurality of windows comprises determining whether the window is enlarged in excess of a preset threshold value or is reduced in size smaller than the preset threshold value.

8. The method as claimed in claim 1, wherein the resizing and displaying of the at least one of the plurality of windows further comprises:
determining whether the window is reduced in size greater than a preset threshold value; and
replacing an execution screen of an application executed in the window to be changed in size with another screen if it is determined that the window is reduced in size greater than the preset threshold value.

9. A display device comprising:
a touch screen configured to:
display execution screens of a plurality of applications in a plurality of windows respectively, such that the windows do not overlap each other, and
display a plurality of boundary lines differentiating the plurality of windows, wherein a first execution screen is displayed in a first window of the plurality of windows; and
at least one processor configured to:
resize and control to display at least one of the plurality of windows in correspondence to a window size change command to change a size of the at least one of the plurality of windows such that the execution screens of the plurality of applications do not overlap each other, when the window size change command is input on the touch screen, and
based on a size of the first window being less than a threshold according to the resizing, display a second execution screen other than the first execution screen in the first window in replacement of the first execution screen,
wherein the first and second execution screens are execution screens of a first application, and
wherein the second execution screen providing an alternate information of the first execution screen.

10. The display device as claimed in claim 9, wherein the window size change command comprises a drag gesture starting from one of the plurality of boundary lines and ending at a first point.

11. The display device as claimed in claim 10, wherein the at least one processor is configured to move, to the first point, a boundary line to which the drag gesture is input and displays the boundary line.

12. The display device as claimed in claim 10, wherein the at least one processor is configured to:
generate views having a predetermined width while the plurality of boundary lines serves as a center line, and determine that the window size change command has been input when the drag gesture is input through the views.

13. The display device as claimed in claim 9, wherein the at least one processor is configured to:
    identify an attribute of an application executed in a window to be changed in size, and
    display an application execution screen of the window to be changed in size based on the attribute of the application.

14. The display device as claimed in claim 13, wherein the at least one processor is configured to identify an attribute of the application comprising at least one of whether a size of an execution screen of the application is changed or whether a horizontal to vertical ratio is changed.

15. The display device as claimed in claim 9, wherein the at least one processor is configured to determine whether the window is enlarged in excess of a preset threshold value or is reduced in size smaller than the preset threshold value.

16. The display device as claimed in claim 9, wherein the at least one processor is further configured to:
    determine whether the window is reduced in size greater than a preset threshold value, and
    replace an execution screen of an application executed in the window to be changed in size with another screen if it is determined that the window is reduced in size greater than the preset threshold value.

* * * * *